(12) United States Patent
Scholtens

(10) Patent No.: US 11,779,147 B2
(45) Date of Patent: Oct. 10, 2023

(54) PASSIVE METERING FOR POUR-OVER COFFEE BREWING

(71) Applicant: Benjamin Christopher Scholtens, Hamilton (CA)

(72) Inventor: Benjamin Christopher Scholtens, Hamilton (CA)

(73) Assignee: Benjamin Christopher Scholtens, Hamilton (CA)

( * ) Notice: Subject to any disclaimer, the term of this patent is extended or adjusted under 35 U.S.C. 154(b) by 219 days.

(21) Appl. No.: 17/338,669

(22) Filed: Jun. 4, 2021

(65) Prior Publication Data

US 2021/0289979 A1 Sep. 23, 2021

Related U.S. Application Data

(62) Division of application No. 15/947,771, filed on Apr. 6, 2018, now Pat. No. 11,096,515.

(60) Provisional application No. 62/483,449, filed on Apr. 9, 2017.

(51) Int. Cl.
| | |
|---|---|
| *A47J 31/10* | (2006.01) |
| *A47J 31/46* | (2006.01) |
| *A47J 31/02* | (2006.01) |
| *A23F 5/26* | (2006.01) |
| *A47J 31/057* | (2006.01) |

(52) U.S. Cl.
CPC ............ *A47J 31/106* (2013.01); *A23F 5/26* (2013.01); *A47J 31/02* (2013.01); *A47J 31/46* (2013.01); *A47J 31/057* (2013.01)

(58) Field of Classification Search
CPC .......... A47J 31/02; A47J 31/057; A47J 31/26; A47J 31/46; A47J 31/106; A23F 5/26
See application file for complete search history.

(56) References Cited

U.S. PATENT DOCUMENTS

| 3,858,493 | A | * | 1/1975 | Hermsen | A47J 31/0631 |
| | | | | | 210/405 |
| 11,096,515 | B2 | * | 8/2021 | Scholtens | A23F 5/26 |
| 2015/0164267 | A1 | * | 6/2015 | Hughes | A47J 31/465 |
| | | | | | 99/302 P |
| 2015/0305544 | A1 | * | 10/2015 | Lancey | A47J 31/0621 |
| | | | | | 426/431 |
| 2018/0168390 | A1 | * | 6/2018 | Ting | A47J 31/0636 |

FOREIGN PATENT DOCUMENTS

FR 2627464 * 8/1989

* cited by examiner

*Primary Examiner* — Anthony J Weier
(74) *Attorney, Agent, or Firm* — CRGO Global; Steven M. Greenberg

(57) ABSTRACT

In pour-over brewing, a vessel containing water can be suspended over a brew basket so that the water can drain, under gravity, into the brew basket and onto the coffee, and the water level in the brew basket is used to regulate the flow of water from the vessel. A vessel that is closed, other than the mouth thereof, and containing brew-heated water, is suspended over the brew basket so that the water can drain from the mouth of the vessel into the brew basket and into the ground coffee to brew liquid coffee, which drains into a container. Rising of the water in the brew basket causes interruption of drainage of the water from the mouth of the vessel into the brew basket, and lowering of the water in the brew basket causes resumption of drainage of the water from the mouth of the vessel into the brew basket.

10 Claims, 39 Drawing Sheets

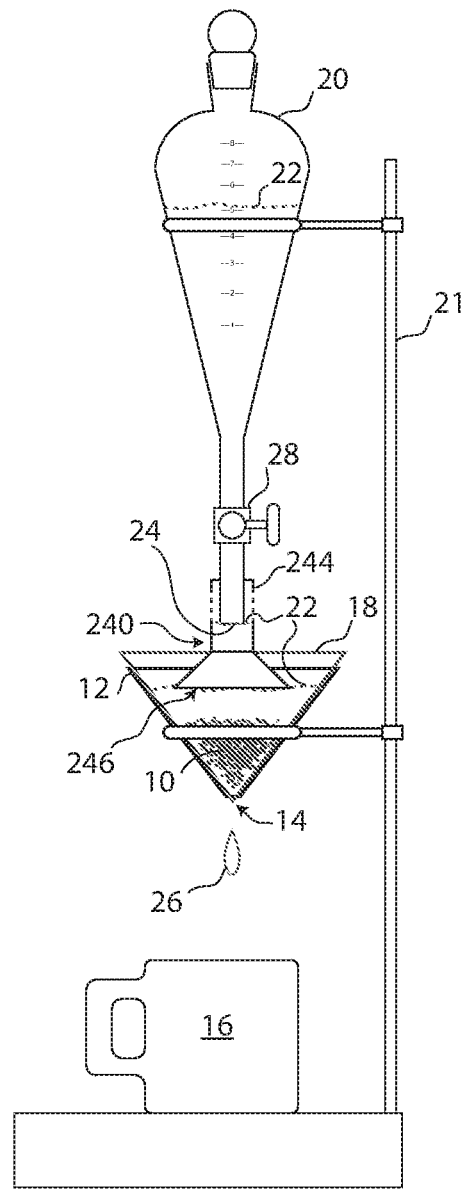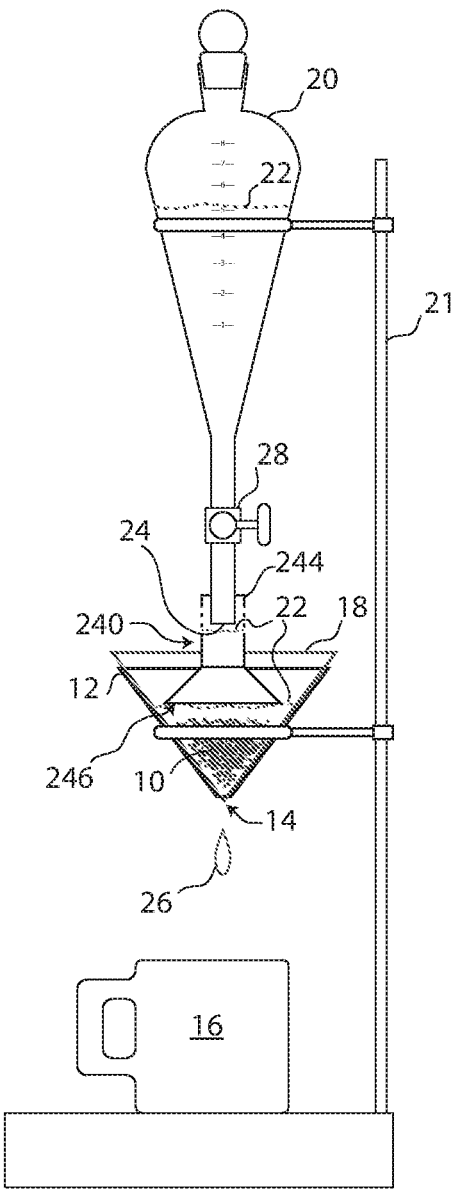
Fig. 4A
Fig. 4B

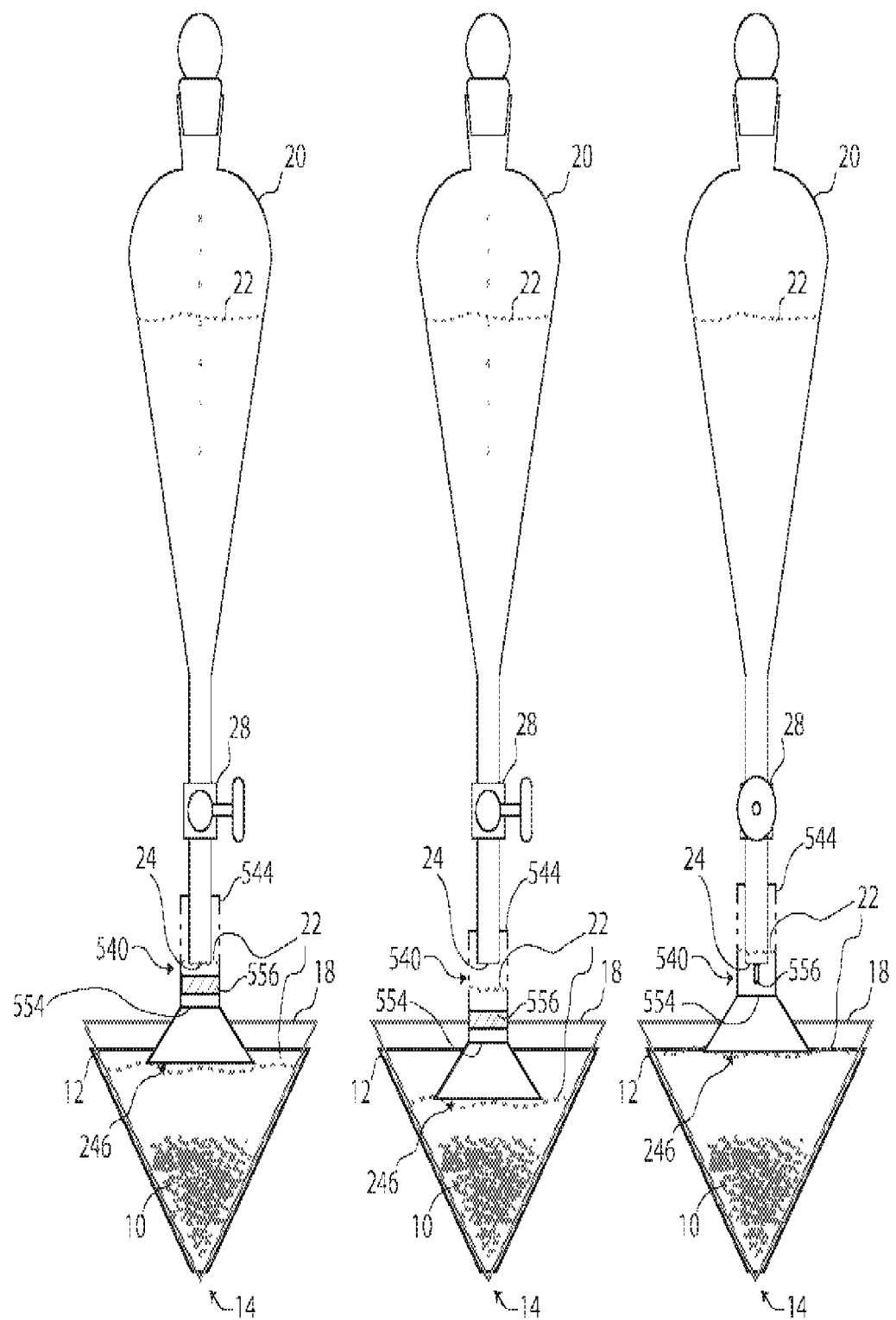

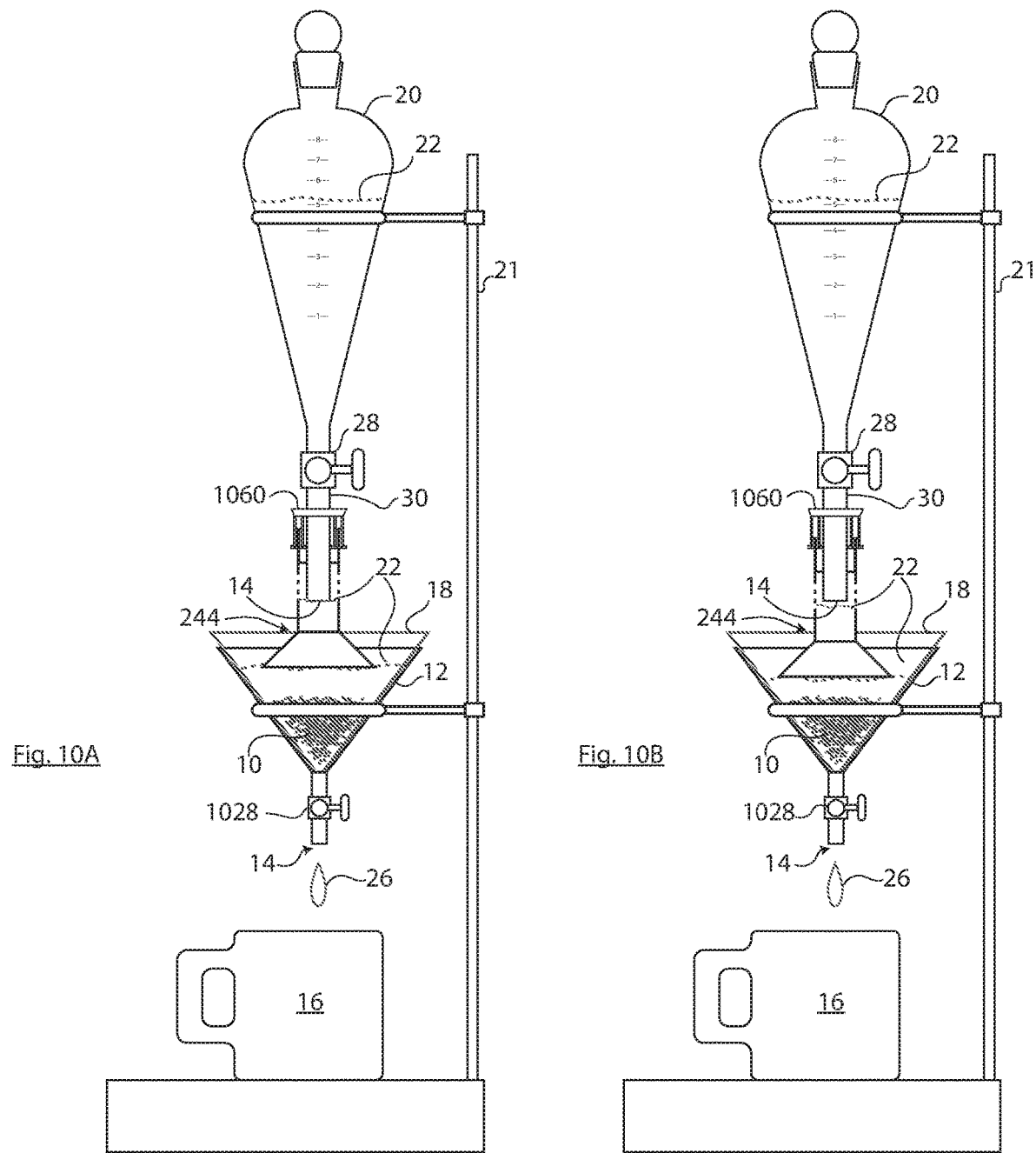

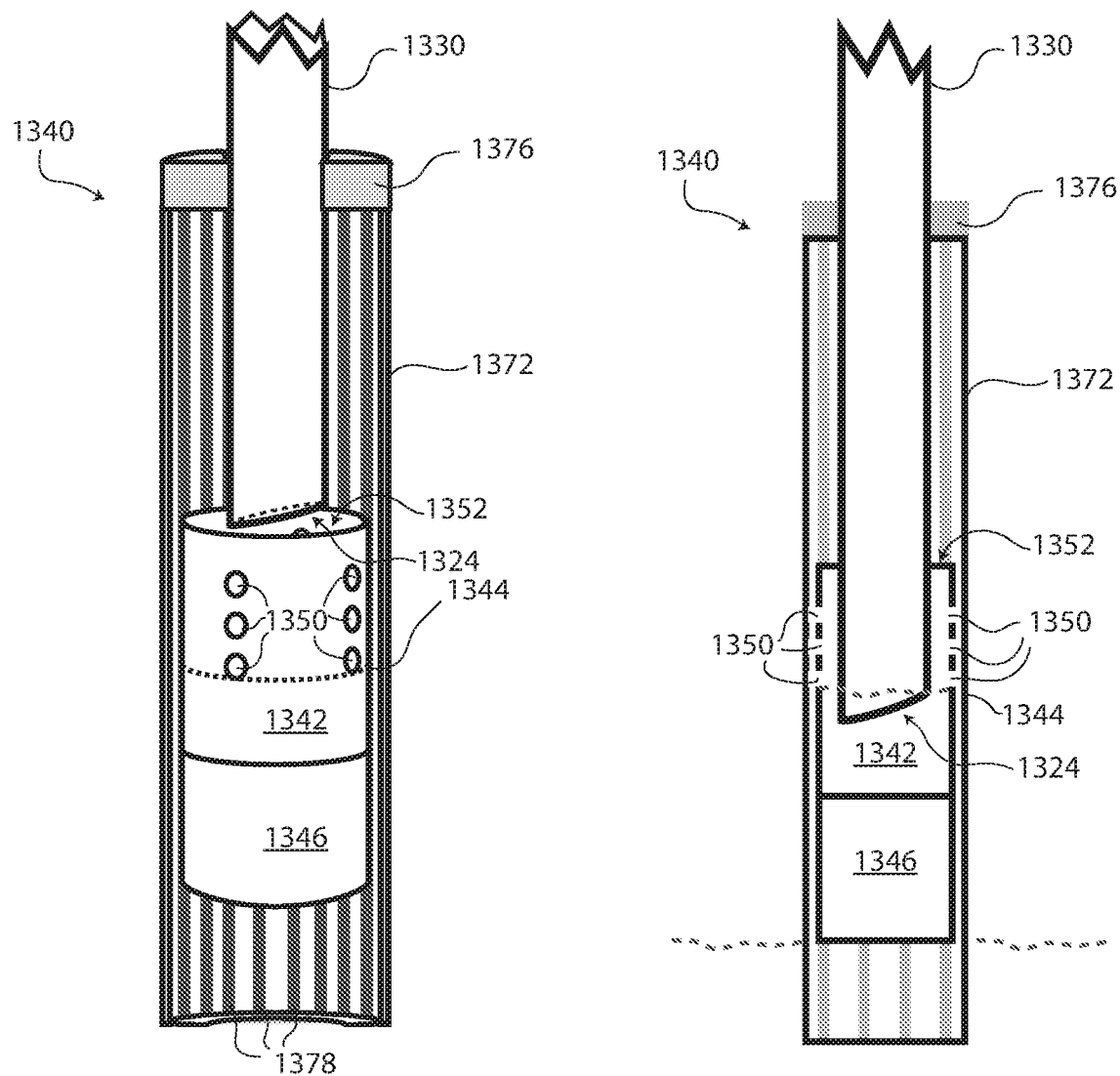
Fig. 13A
Fig. 13B
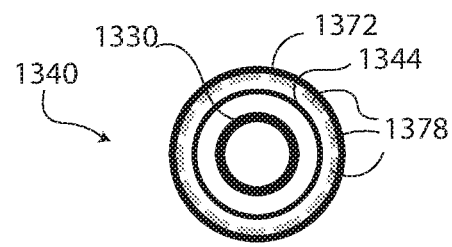
Fig. 13C

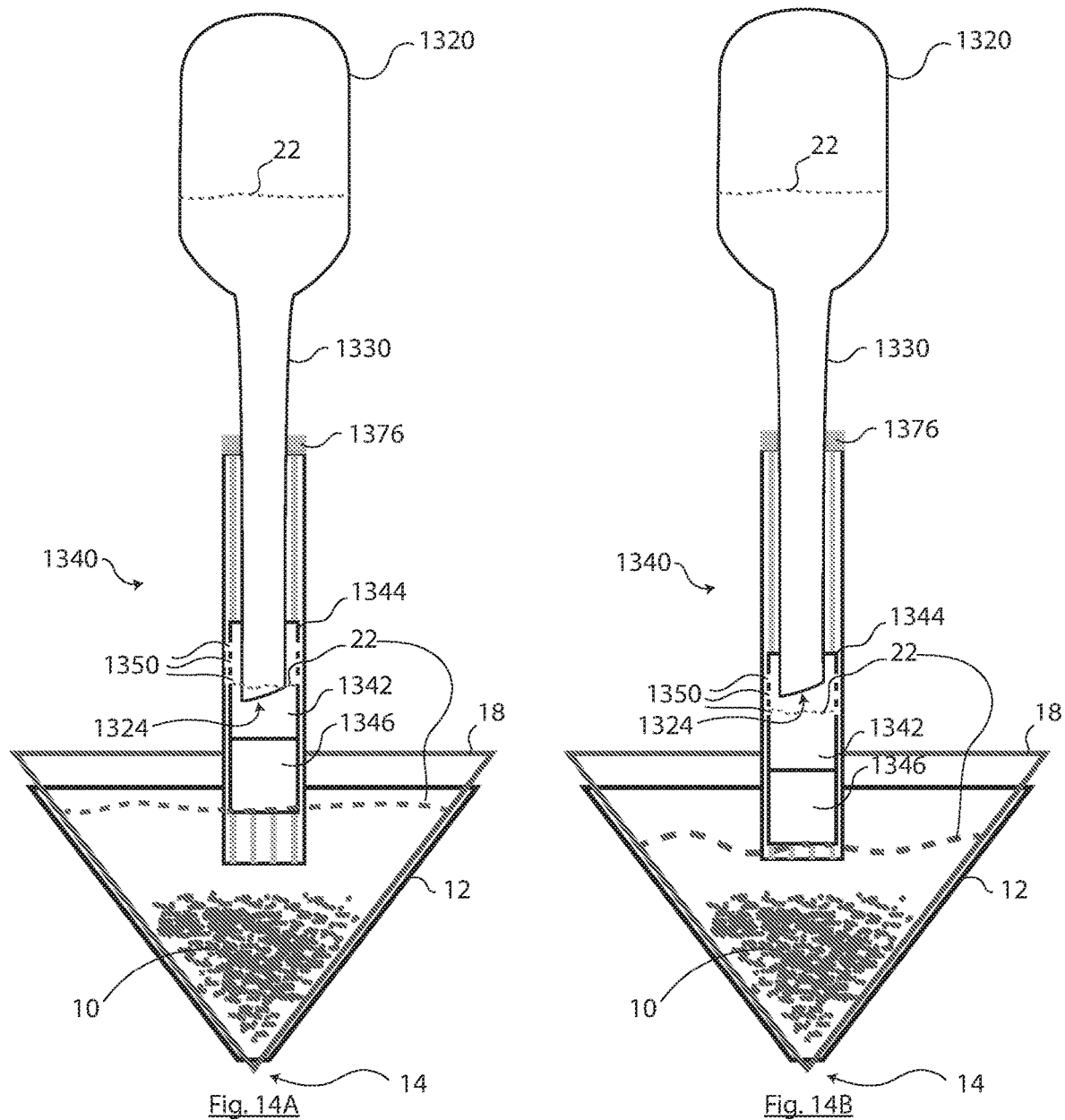

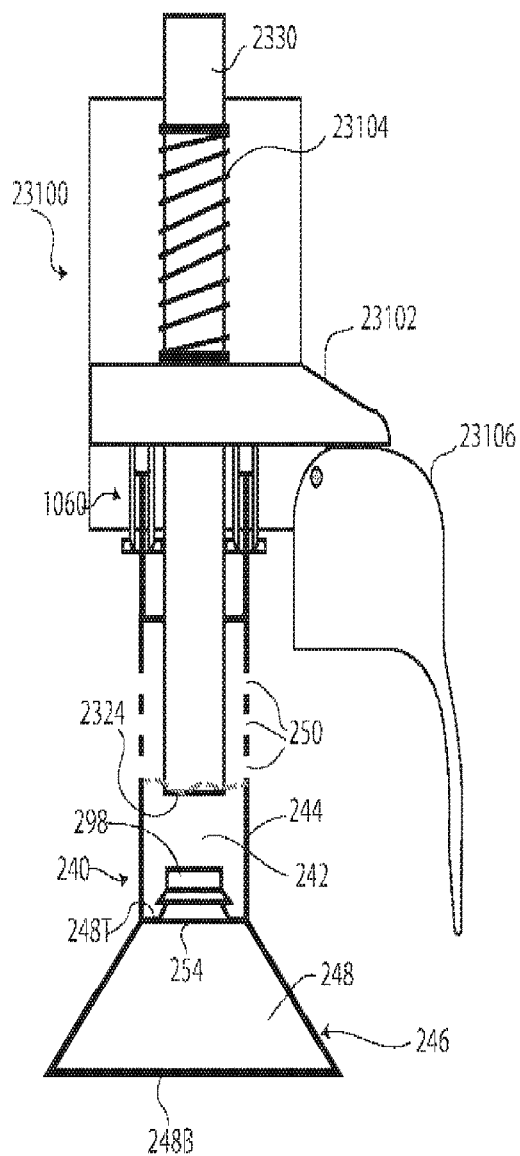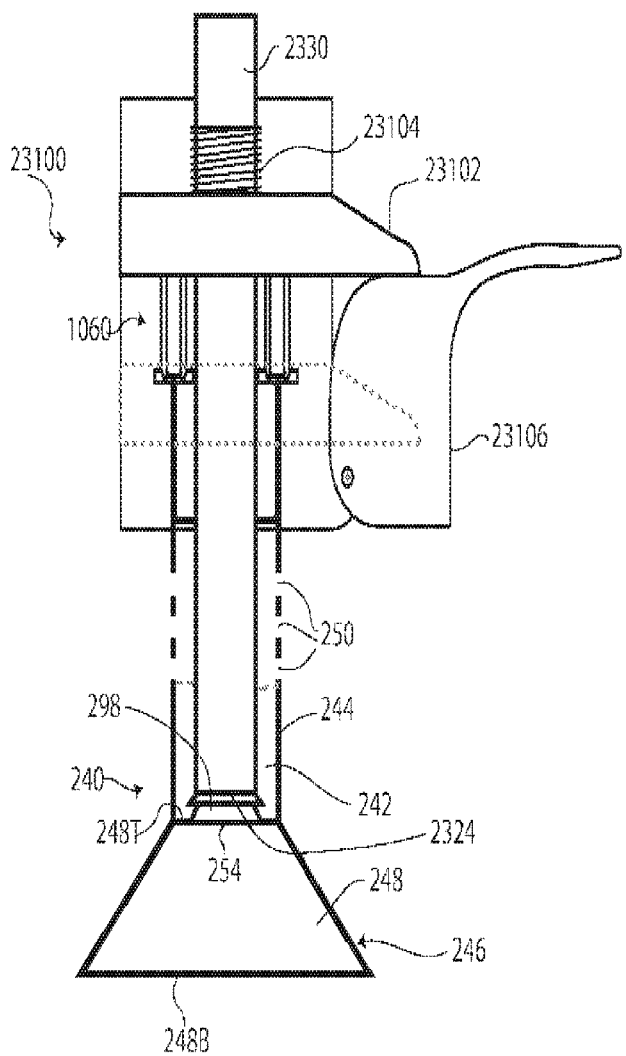
Fig. 23A
Fig. 23B

PASSIVE METERING FOR POUR-OVER COFFEE BREWING

CROSS-REFERENCE TO RELATED APPLICATION

This application is a Divisional of U.S. patent application Ser. No. 15/947,771, filed Apr. 6, 2018, now U.S. Pat. No. 11,096,515, which claims priority to U.S. Provisional Patent Application No. 62/483,449, filed Apr. 9, 2017, the entirety of each which is incorporated herein by reference.

TECHNICAL FIELD

The present disclosure relates to coffee brewing, and more particularly to pour-over coffee brewing.

BACKGROUND

In pour-over brewing, a coffee filter is placed in a filter holder (sometimes called a "coffee cone") and filled with ground roasted coffee. A container (e.g. a cup or carafe) is positioned under the filter holder, and hot water (or cold water for a cold brew) is poured over the ground coffee. The water absorbs the essence of the coffee as the water flows through the coffee grounds and filter and through an aperture into the container. While this approach permits the brewing of an artisanal cup of coffee and is becoming increasingly popular, it is time-consuming and requires careful attention, and is not particularly well-suited to a busy restaurant or café.

SUMMARY

According to the various exemplary methods described herein, rather than manually pouring the water over the coffee, a vessel containing the water can be suspended over a brew basket containing the coffee so that the water can drain, under gravity, into the brew basket and onto the coffee, and the water level in the brew basket is used to regulate the flow of water from the vessel, without close human supervision.

In one aspect, a method for pour-over brewing of coffee comprises supporting a quantity of ground coffee in a brew basket having at least one coffee drainage aperture formed therethrough, suspending a vessel that is closed, other than the mouth thereof, and containing brew-heated water, over the brew basket so that the water in the vessel can drain under gravity from a mouth of the vessel into the brew basket and into the ground coffee to brew liquid coffee, and draining the liquid coffee into a container. Rising of the level of the water in the brew basket causes interruption of drainage of the water from the mouth of the vessel into the brew basket, and lowering of the level of the water in the brew basket causes resumption of drainage of the water from the mouth of the vessel into the brew basket.

In one embodiment, the vessel is positioned with its mouth within the brew basket. In this embodiment, rising of the level of the water in the brew basket causes interruption of drainage of the water from the mouth of the vessel into the brew basket by obstructing a flow of air into the vessel when the level of the water reaches the mouth of the vessel, and lowering of the level of the water in the brew basket causes resumption of drainage of the water from the mouth of the vessel into the brew basket by permitting the flow of air into the vessel when the level of the water falls below the mouth of the vessel.

In some embodiments, a passive metering valve is interposed in a fluid path between the mouth of the vessel and the brew basket. The passive metering valve may be configurable, relative to the mouth of the vessel, in an open configuration in which the water in the vessel can drain under gravity from the mouth of the vessel into the brew basket, and a closed configuration in which drainage of the water in the vessel from the mouth of the vessel into the brew basket is inhibited.

In some embodiments, when the passive metering valve is in the closed configuration, drainage of the water in the vessel from the mouth of the vessel into the brew basket is inhibited by obstruction of a flow of air into the vessel to inhibit displacement of the water in the vessel, and when the passive metering valve is in the open configuration, drainage of the water in the vessel from the mouth of the vessel into the brew basket is permitted by permitting the flow of air into the vessel to displace the water in the vessel. In particular embodiments, a float portion of the passive metering valve is buoyantly supported by the water in the brew basket. Rising of the level of the water in the brew basket causes interruption of drainage of the water from the mouth of the vessel into the brew basket by flotation of the float portion moving the passive metering valve into the closed configuration, and lowering of the level of the water in the brew basket causes resumption of drainage of the water from the mouth of the vessel into the brew basket by flotation of the float portion moving the passive metering valve into the open configuration.

In particular implementations, the passive metering valve comprises the float portion and a reservoir carried by the float portion, the reservoir being in fluid communication with the vessel for receiving the water from the vessel and the reservoir overflows into the brew basket. In some such embodiments, rising of the level of the water in the brew basket causes interruption of drainage of the water from the mouth of the vessel into the brew basket by flotation of the float portion raising the passive metering valve until the water in the reservoir obstructs the flow of air into the vessel, and lowering of the level of the water in the brew basket causes resumption of drainage of the water from the mouth of the vessel into the brew basket by flotation of the float portion lowering the passive metering valve until the flow of air into the vessel is unobstructed by the water in the reservoir and the water in the reservoir overflows from the reservoir into the brew basket upon displacement by the water from the vessel. In some particular implementations, the reservoir is formed by a tube depending from and sealed off from the float portion and having at least one water drainage aperture longitudinally spaced from the float portion, with the end of the tube that is remote from the float portion being open for receiving the water from the vessel. In such implementations, rising of the level of the water in the brew basket causes interruption of drainage of the water from the mouth of the vessel into the brew basket by flotation of the float portion raising the passive metering valve until the water in the tube obstructs the flow of air into the vessel, and lowering of the level of the water in the brew basket causes resumption of drainage of the water from the mouth of the vessel into the brew basket by flotation of the float portion lowering the passive metering valve until the flow of air into the vessel is unobstructed by the water in the tube and the water in the tube can drain from the tube through the at least one water drainage aperture into the brew basket.

In some embodiments, a filter is interposed between the ground coffee and the coffee drainage aperture(s) formed through the brew basket. In other embodiments, the brew basket includes an integral filter.

In another aspect, a passive metering valve comprises a float portion and a reservoir carried by the float portion. The reservoir has an open superior end adapted for fluid communication with a water vessel to receive water therefrom, and the passive metering valve has at least one overflow path adapted for overflowing into a brew basket.

In some embodiments, in use, rising of the level of the water in the brew basket causes interruption of drainage of the water from the mouth of the vessel into the brew basket by flotation of the float portion raising the passive metering valve until the water in the reservoir obstructs the flow of air into the vessel, and lowering of the level of the water in the brew basket causes resumption of drainage of the water from the mouth of the vessel into the brew basket by flotation of the float portion lowering the passive metering valve until the flow of air into the vessel is unobstructed by the water in the reservoir and the water in the reservoir overflows from the reservoir into the brew basket upon displacement by the water from the vessel.

A passive metering system may comprise the aforementioned passive metering valve as well as a water vessel and brew basket.

In some embodiments, the reservoir is formed by a tube depending from and sealed off from the float portion, with the overflow path(s) being at least partially formed by at least one water drainage aperture longitudinally spaced from the float portion, and the open superior end results from an end of the tube remote from the float portion being open for receiving the water from the vessel. In some such embodiments, in use, rising of the level of the water in the brew basket causes interruption of drainage of the water from the mouth of the vessel into the brew basket by flotation of the float portion raising the passive metering valve until the water in the tube obstructs the flow of air into the vessel, and lowering of the level of the water in the brew basket causes resumption of drainage of the water from the mouth of the vessel into the brew basket by flotation of the float portion lowering the passive metering valve until the flow of air into the vessel is unobstructed by the water in the tube and the water in the tube can drain from the tube through the at least one water drainage aperture into the brew basket.

BRIEF DESCRIPTION OF THE DRAWINGS

These and other features will become more apparent from the following description in which reference is made to the appended drawings wherein:

FIGS. 4A and 4B show use of the passive metering valve of FIG. 2A in combination with the vessel of FIG. 3 for pour-over brewing of coffee;

FIGS. 6A, 6B, and 6C show use of the passive metering valve of FIG. 5A in combination with the vessel of FIG. 3 for pour-over brewing of coffee;

FIGS. 10A and 10B show use of the passive metering valve of FIG. 2A in combination with a guide harness on the vessel of FIG. 3 for pour-over brewing of coffee;

FIG. 13A is a cut-away perspective view of a fourth exemplary passive metering valve according to an aspect of the present disclosure;

FIG. 13B is a side cross-sectional view of the passive metering valve of FIG. 13A;

FIG. 13C is a top plan view of a portion of the passive metering valve of FIG. 13A;

FIGS. 14A and 14B show use of the passive metering valve of FIG. 13A in combination with a vessel for pour-over brewing of coffee;

FIGS. 23A and 23B show a first variant of a second exemplary locking mechanism incorporating a lever cam actuator and which may be used, in conjunction with a guide harness, with suitable passive metering valves according to aspects of the present disclosure;

DETAILED DESCRIPTION

Figure 1A:
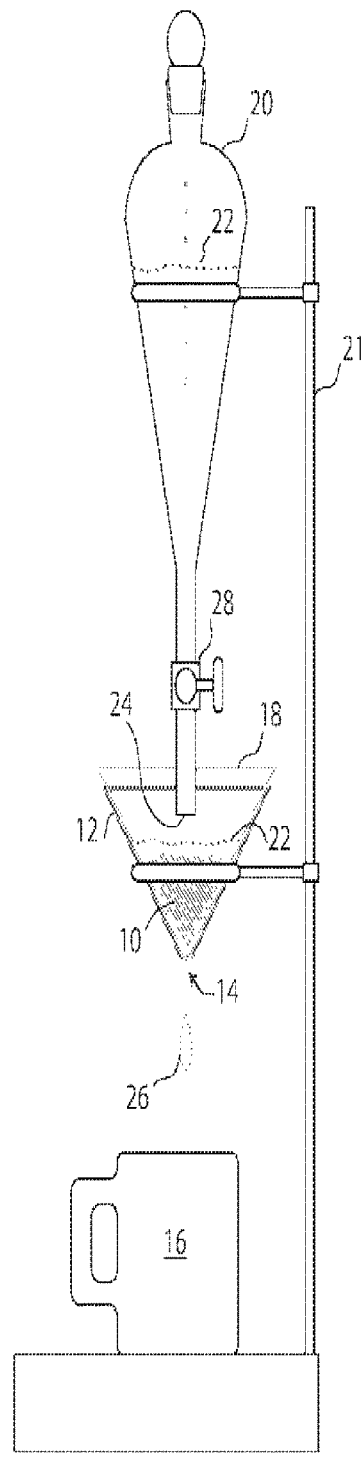
FIGS. 1A, 1B and 1C show a first exemplary method for pour-over brewing of coffee according to an aspect of the present disclosure.
Figure 1B:
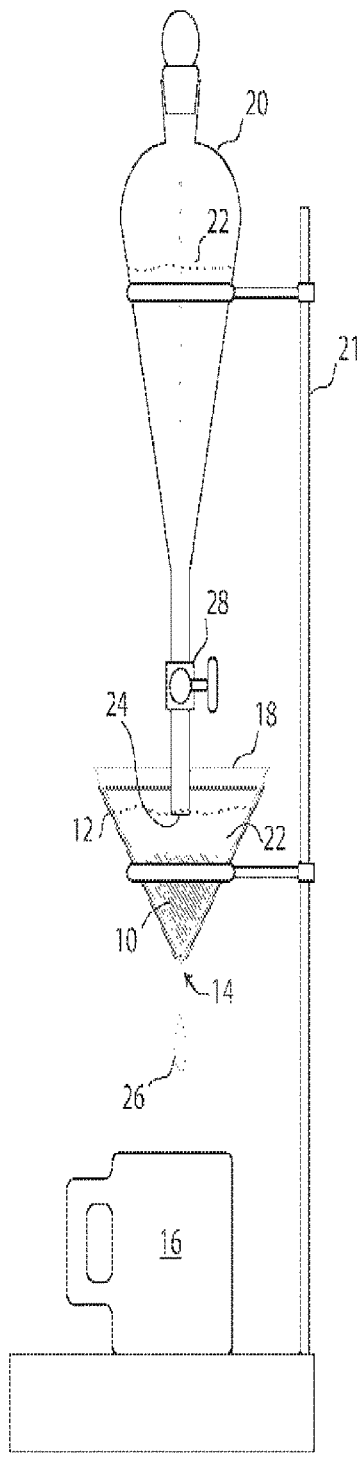
Figure 1C:
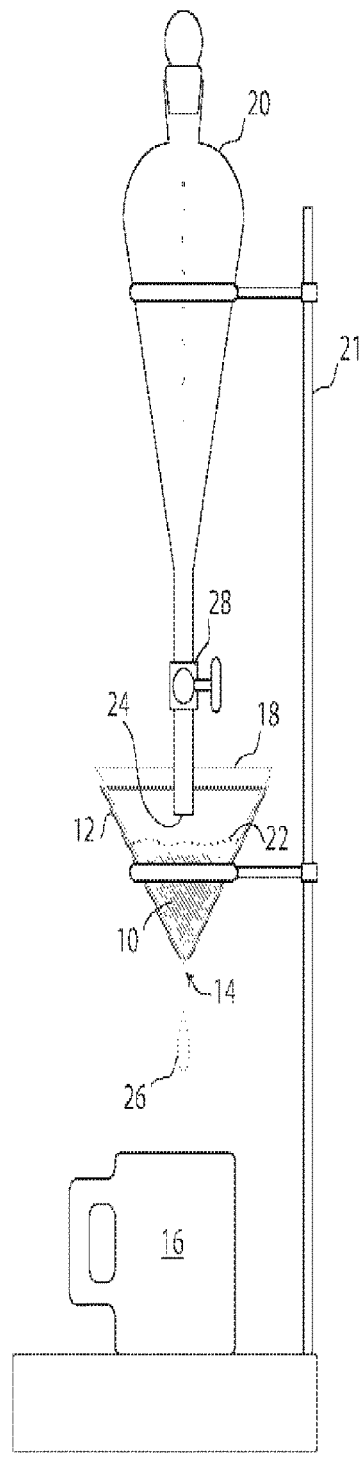
Figure 2A:
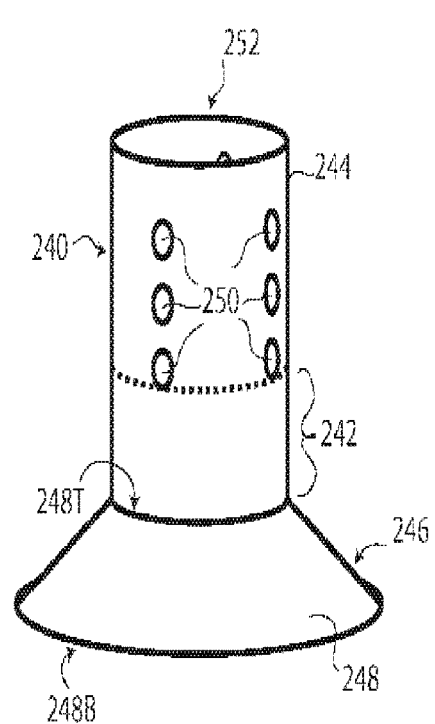
FIG. 2A is a top perspective view of a first exemplary passive metering valve according to an aspect of the present disclosure.
Figure 2B:
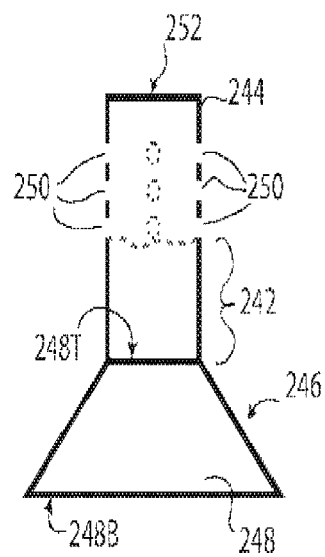
FIG. 2B is a side cross-sectional view of the passive metering valve of FIG. 2A.

Reference is now made to FIGS. 1A through 1C, which show a first exemplary method for pour-over brewing of coffee according to the present disclosure.

A quantity of ground roasted coffee 10 is supported in a brew basket 12 in the form of a coffee cone having a coffee drainage aperture 14 at its apex to permit the brewed coffee to drain into a container 16. A filter 18 is placed in the brew basket 12 such that the filter 18 is interposed between the ground coffee 10 and the coffee drainage aperture 14 formed through the brew basket 12. While the exemplary brew basket 12 is shown as a coffee cone, any suitable brew basket having at least one coffee drainage aperture formed therethrough may be used, and the brew basket may be of any suitable shape. Moreover, in other embodiments the brew basket may include an integral filter, and in such embodiments the pores of the filter may serve as coffee drainage apertures.

Continuing to refer to FIGS. 1A through 1C, a vessel 20 containing brew-heated water 22 is suspended, for example by way of stand 21 or other apparatus (not shown in FIGS. 1A to 1C) over the brew basket 12. The term "brew-heated" simply refers to water at the desired temperature for the intended brewing, and may be for example water that is just below boiling, water that is hot but substantially below boiling, or room temperature, or cold water (for a cold brew). With the vessel 20 suspended over the brew basket 12, the water 22 in the vessel 20 can drain under gravity from the mouth 24 of the vessel 20 into the brew basket 12 and into the ground coffee 10 to brew liquid coffee 26. Other than the mouth 24, the vessel 20 is closed. The liquid coffee 26 then drains through the coffee drainage aperture 14 into the container 16. Optionally, a shut-off valve 28 can be provided at or adjacent the mouth 24 of the vessel to control initiation and termination of the brewing process.

In the exemplary implementation shown in FIGS. 1A through 1C, the vessel 20 is positioned with its mouth 14 within the brew basket 12, and the water 22 flows from the mouth 24 of the vessel 20 into the brew basket 12 under gravity. As the flow begins, as shown in FIG. 1A, the level of the water 22 in the brew basket 12 will be below the mouth 24 of the vessel 20, so that air can pass through the mouth 24 of the vessel 20 to displace the water 22 flowing out. When the level of the water 22 reaches the mouth 24 of the vessel 20, flow stops because no air can enter the mouth 24 of the vessel 20 to displace the water 22, as shown in FIG. 1B. Thus, rising of the level of the water 22 in the brew basket 12 causes interruption of drainage of the water 22 from the mouth 24 of the vessel 20 into the brew basket 12 by obstructing the flow of air into the vessel 20 when the level of the water 22 reaches the mouth 24 of the vessel 20. As the liquid coffee 26 drains from the coffee drainage aperture 14 into the container 16, the level of the water 22 in the brew basket 12 falls below the mouth 24 of the vessel 20, exposing the mouth 24 and thereby allowing air to enter and displace water 22 in the vessel 20 to refill the brew basket 12. Thus, lowering of the level of the water 22 in the brew basket 12 causes resumption of drainage of the water from the mouth 24 of the vessel 20 into the brew basket 12 by permitting the flow of air into the vessel 20 when the level of the water 22 in the brew basket 12 falls below the mouth 24 of the vessel 20.

While this approach eliminates the need for a human being to carefully pour the water over the ground coffee, there tends to be "backwash", and coffee grinds can enter the vessel. This disturbs the grinds and interferes with the brewing and also contaminates the water in the vessel, requiring more intensive cleaning.

Thus, according to further aspects of the disclosure a passive metering valve may be interposed in a fluid path between the mouth of the vessel and the brew basket to control the flow of water from the vessel into the brew basket and inhibit contamination of the water in the vessel. Such a passive metering valve is configurable, relative to the mouth of the vessel, in an open configuration in which the water in the vessel can drain under gravity from the mouth of the vessel into the brew basket, and a closed configuration in which drainage of the water in the vessel from the mouth of the vessel into the brew basket is inhibited. More particularly, in preferred embodiments, when the passive metering valve is in the closed configuration, drainage of the water in the vessel from the mouth of the vessel into the brew basket is inhibited by obstruction of a flow of air into the vessel to inhibit displacement of the water in the vessel, and when the passive metering valve is in the open configuration, drainage of the water in the vessel from the mouth of the vessel into the brew basket is permitted by permitting the flow of air into the vessel to displace the water in the vessel.

Particularly preferred embodiments of the passive metering valves each include a float portion that is buoyantly supported by the water in the brew basket, and are constructed so that rising of the level of the water in the brew basket causes interruption of drainage of the water from the mouth of the vessel into the brew basket by flotation of the float portion moving the passive metering valve into the closed configuration and lowering of the level of the water in the brew basket causes resumption of drainage of the water from the mouth of the vessel into the brew basket by flotation of the float portion moving the passive metering valve into the open configuration.

In the exemplary embodiments described herein, the passive metering valves comprise, in addition to the float portion, a reservoir carried by the float portion. This reservoir is adapted for fluid communication with the vessel for receiving the water from the vessel, and the passive metering valve has at least one overflow path adapted to allow water to overflow the reservoir into the brew basket. In these embodiments, rising of the level of the water in the brew basket causes interruption of drainage of the water from the mouth of the vessel into the brew basket by flotation of the float portion raising the passive metering valve until the water in the reservoir obstructs the flow of air into the vessel. Conversely, lowering of the level of the water in the brew basket causes resumption of drainage of the water from the mouth of the vessel into the brew basket by flotation of the float portion lowering the passive metering valve until the flow of air into the vessel is unobstructed by the water in the reservoir and the water in the reservoir overflows from the reservoir, via the overflow path(s), into the brew basket upon displacement by the water from the vessel.

Several non-limiting examples of passive metering valves will now be described.

Figure 3:
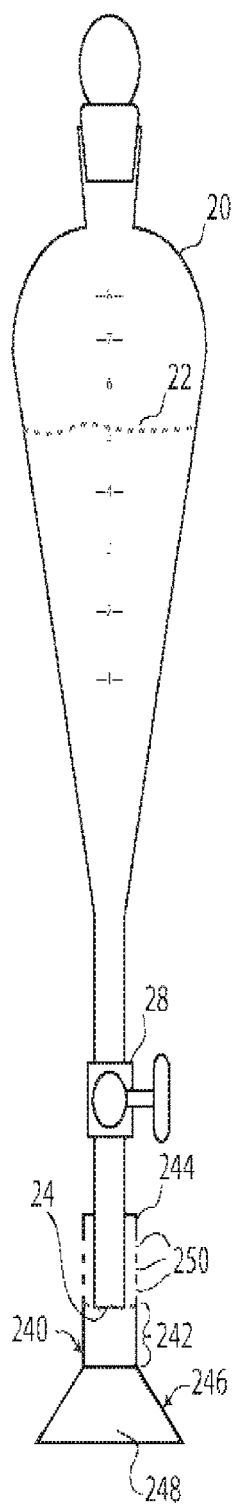
FIG. 3 shows the passive metering valve of FIG. 2A in combination with a vessel.

Reference is now made to FIGS. 2A to 4B, in which a first exemplary passive metering valve is denoted generally by reference 240. In the passive metering valve 240, the reservoir 242 is formed by a tube 244 depending from and sealed off from the float portion 246, which in the illustrated embodiment takes the form of a closed-top, open-bottomed frusto-conical element 248 which achieves buoyancy by way of air trapped between the open bottom 248B and the closed top 248T when the open bottom 248B engages the surface of the water. In other embodiments, the float portion may have other shapes, or be a solid element or an enclosed hollow element. The tube 244 has a plurality of water drainage apertures 250 longitudinally spaced from the float portion 246, and the superior end 252 of the tube 244, that is, the end 252 that is remote from the float portion 246, is open and thereby adapted for receiving the water from the vessel; the portion of the tube 244 between the float portion 246 and the water drainage apertures 250 defines the reservoir 242. FIG. 3 shows the first exemplary passive metering valve 240 in combination with the vessel 20; the mouth 24 of the vessel 20 is received in the open end 252 of the tube 244. While the water drainage apertures 250 are shown as vertically extending series of openings in the illustrated embodiment, they may have any suitable shape and configuration.

FIGS. 4A and 4B show use of the first exemplary passive metering valve 240 in combination with the vessel 20 for pour-over brewing of coffee.

In FIG. 4A, the first exemplary passive metering valve 240 is in the closed configuration; rising of the level of the water 22 in the brew basket 12 causes interruption of drainage of the water 22 from the mouth 24 of the vessel 20 into the brew basket 12 by flotation of the float portion 246 raising the passive metering valve 240 until the water 22 in the tube 244 obstructs the flow of air into the vessel. More particularly, the water drainage apertures 250 (FIGS. 2A to 3) are positioned above the mouth 24 of the vessel 20 such that the mouth 24 of the vessel 20 will interface with the surface of the water 22 in the tube 244. This interface between the mouth 24 of the vessel 20 and the surface of the water 22 in the tube 244 prevents air from entering the mouth 24 of the vessel 20 to displace water 22 from therein, thereby stopping the flow of water 22 from the vessel 20.

In FIG. 4B, the first exemplary passive metering valve 240 is in the open configuration; lowering of the level of the water 22 in the brew basket 12 causes resumption of drainage of the water 22 from the mouth 24 of the vessel 20 into the brew basket 12 by flotation of the float portion 246 lowering the passive metering valve 240 until the flow of air into the vessel 20 is unobstructed by the water 22 in the tube 244 and the water 22 in the tube 244 can drain from the tube 244 through the water drainage apertures 250 into the brew basket 12. More particularly, in this position at least some of the water drainage apertures 250 are below the mouth 24 of the vessel 20, so water can flow from the mouth 24 of the vessel 20 into the tube 244 (since air can enter the tube via the water drainage apertures 250 and open end 252 (FIGS. 2A and 2B) and then flow into the mouth 24 of the vessel 20 to displace the water 22). Since the lower end 254 of the tube 244 is closed, the level of water 22 in the tube rises (within the reservoir 242) until it reaches the water drainage apertures 250. The water 22 then flows out of the tube 244 through the water drainage apertures 250 and along the outside of the tube 244 and the float portion 246 and into the brew basket 12; this provides an overflow path to the brew basket 12.

As more water flows into the brew basket 12, the water level in the brew basket 12 begins to rise, carrying the float portion 246 (and hence the tube 244) with it until the passive metering valve 240 returns to the closed configuration shown in FIG. 4A. As water seeps through the ground coffee 10 and filter 18 and exits the brew basket 12, the water level in the brew basket 12 becomes lower, lowering the float portion 246 (and hence the tube 244) until the passive metering valve 240 is in the open configuration shown in FIG. 4B. This enables water 22 to flow from the mouth 24 of the vessel 20 into the tube 244 and from the tube 244 through the water drainage apertures 250 into the brew basket 12 (i.e. an overflow path to the brew basket 12), which continues until the water level again rises to the point where the passive metering valve 240 returns to the closed configuration shown in FIG. 4A. This reciprocal cycle continues until the vessel 20 is empty or until the shut-off valve 28 is closed.

Figure 5A:
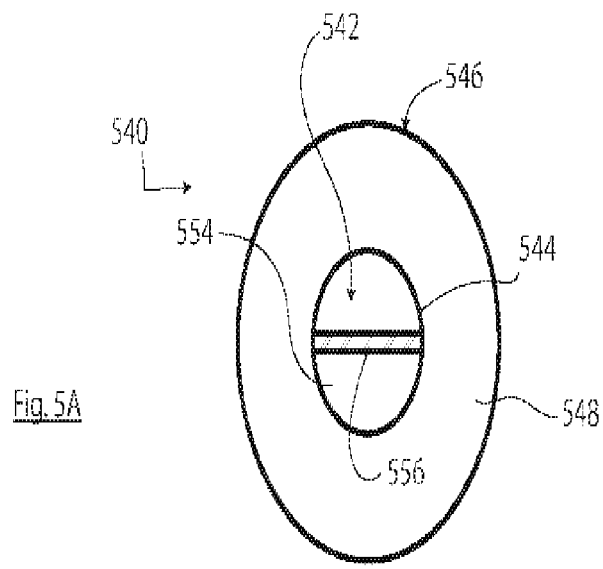
FIG. 5A is a top plan view of a second exemplary passive metering valve according to the present disclosure.
Figure 5B:
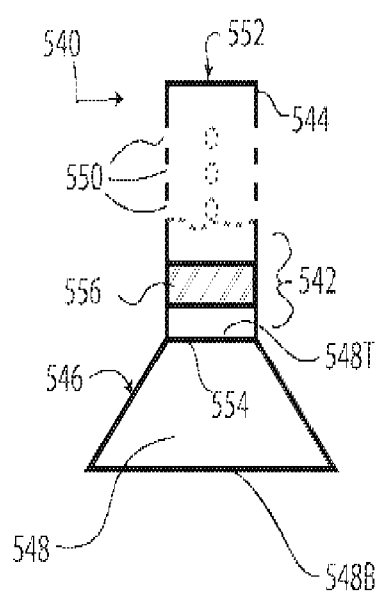
FIG. 5B is a first side cross-sectional view of the passive metering valve of FIG. 5A.
Figure 5C:
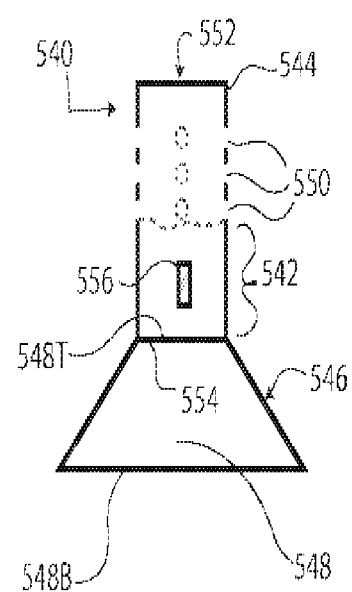
FIG. 5C is a second side cross-sectional view of the passive metering valve of FIG. 5A, taken at 90 degrees from the cross-sectional view in FIG. 5B.
Figure 7A:
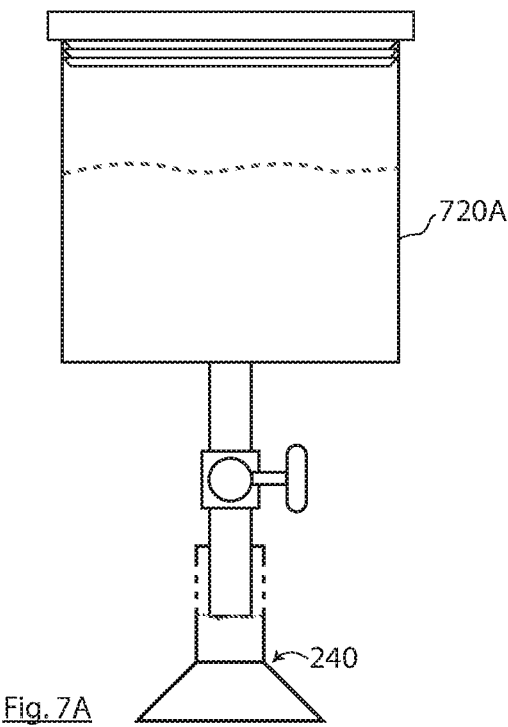
FIGS. 7A, 7B, 7C and 7D show various vessels in combination with the passive metering valve of FIG. 2A.
Figure 7B:
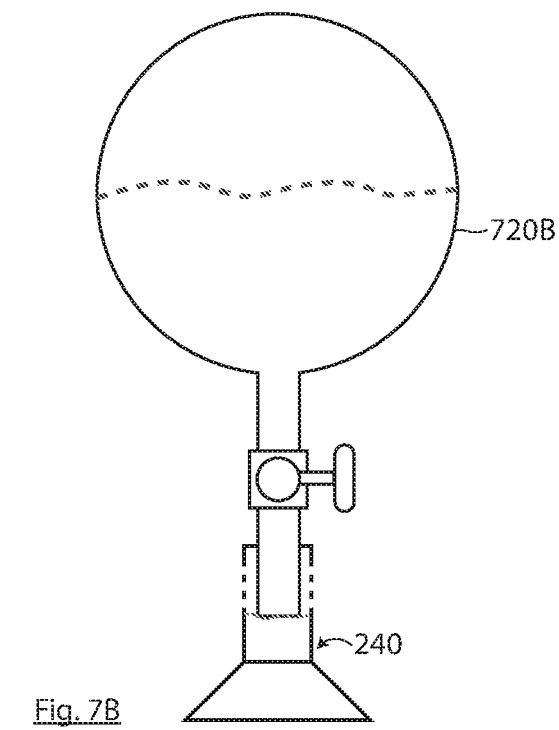
Figure 7C:
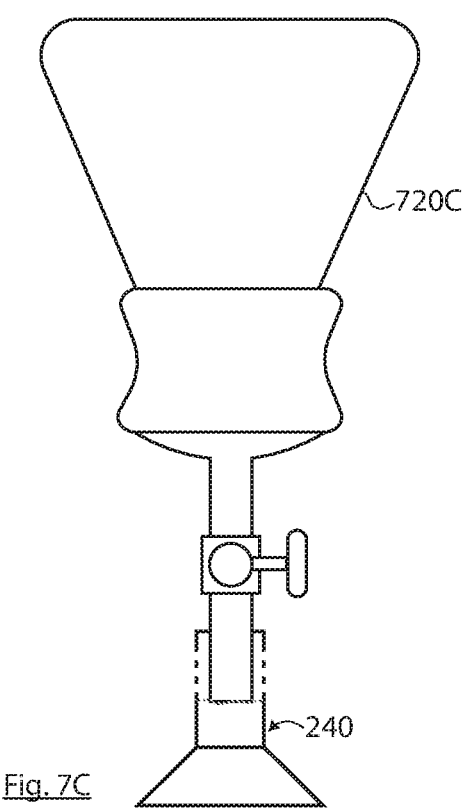
Figure 7D:
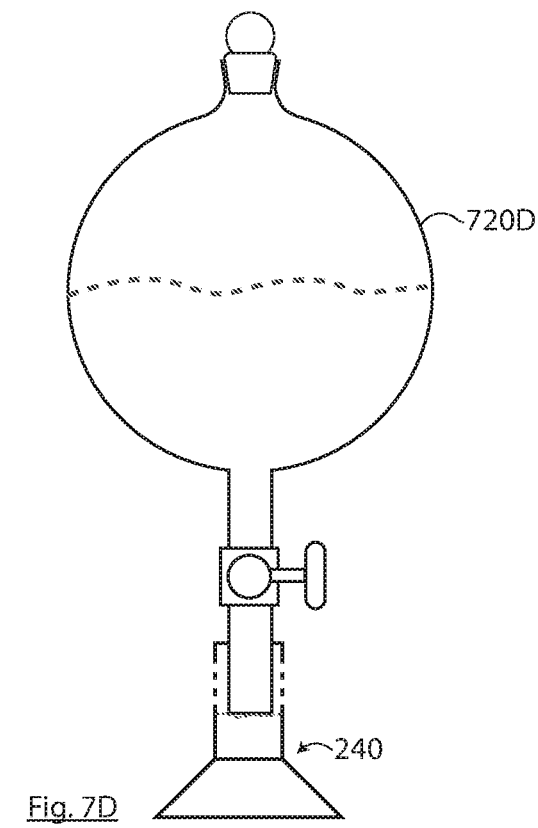

Reference is now made to FIGS. 5A to 5C, which show a second exemplary passive metering valve 540. The second exemplary passive metering valve 540 is similar to the first exemplary passive metering valve 240, with like reference numerals denoting like features except with the prefix "5" instead of "2". The second exemplary passive metering valve 540 differs from the first exemplary passive metering valve 240 in that the second exemplary passive metering valve 540 includes a crossbar 556 extending across the tube 544 within the reservoir 542, between the float portion 546 and the water drainage apertures 550. The crossbar 556 acts as a stop to prevent the mouth 24 of the vessel 20 from engaging the closed end 554 of the tube 544 and adhering thereto by suction. FIG. 6A shows the second exemplary passive metering valve 540 in the closed configuration, FIG. 6B shows the second exemplary passive metering valve 540 in the open configuration and FIG. 6C shows the crossbar 556 engaged with the mouth 24 of the vessel 20.

Passive metering valves according to aspects of the present disclosure can be used with vessels of various sizes and shapes. FIGS. 7A to 7D show several different vessels 720A to 720D, respectively, in combination with the first exemplary passive metering valve 240.

Figure 8A:
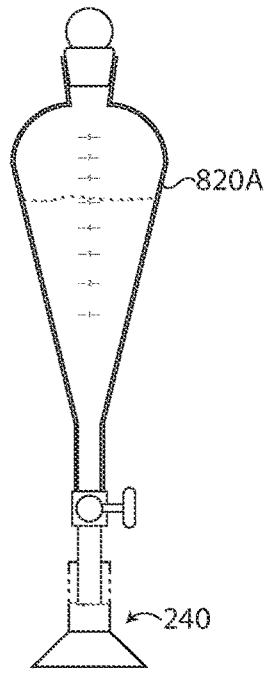
FIGS. 8A, 8B, 8C and 8D show various insulated/heated vessels in combination with the passive metering valve of FIG. 2A.
Figure 8B:
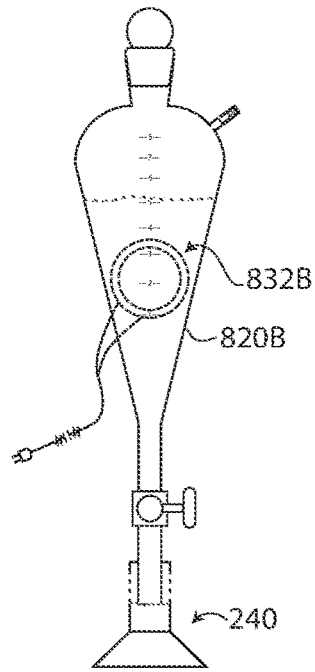
Figure 8C:
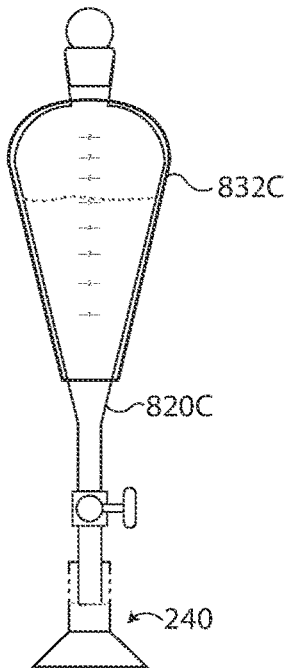
Figure 8D:
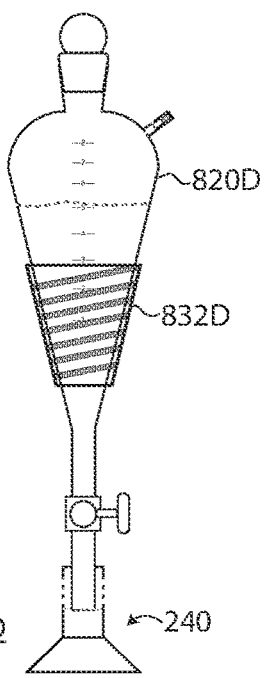
Figure 9A:
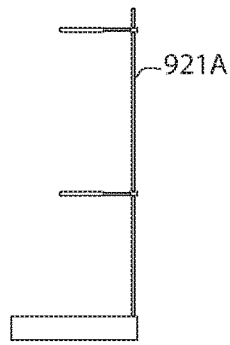
FIGS. 9A, 9B, 9C, 9D, 9E, 9F, and 9G show various different types of stands which can be used to accommodate vessels and containers of various sizes and shapes when using passive metering valves according to aspects of the present disclosure.
Figure 9B:
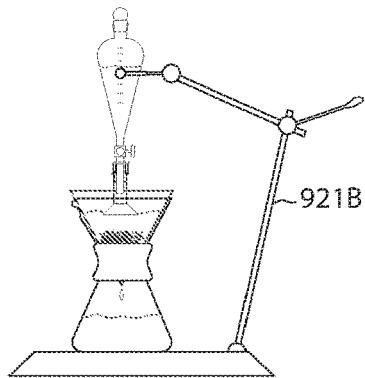
Figure 9C:
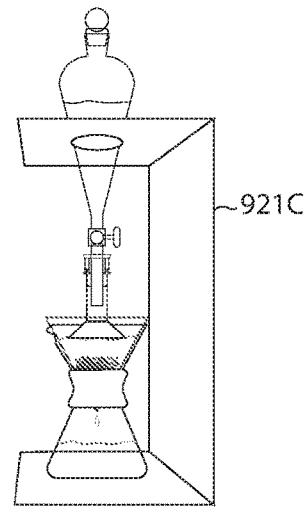
Figure 9D:
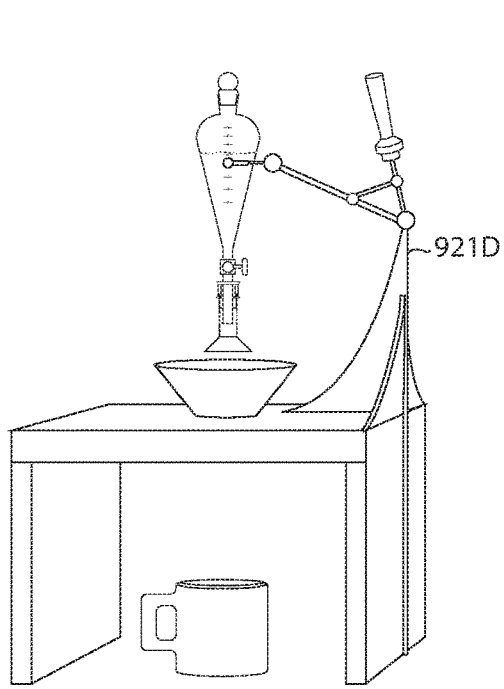
Figure 9E:
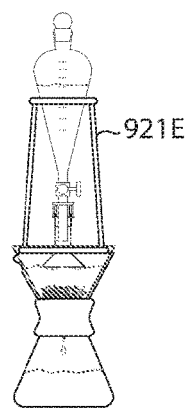
Figure 9F:
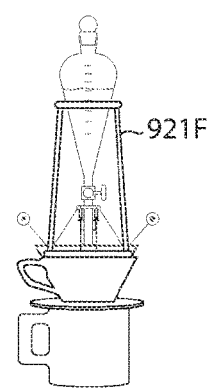
Figure 9G:
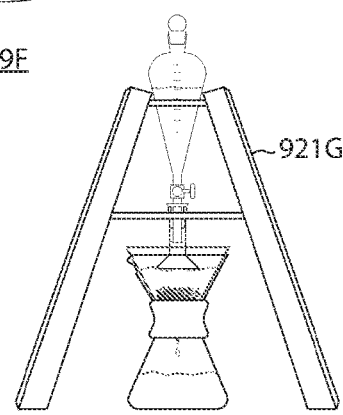

Passive metering valves according to aspects of the present disclosure can also be used with vessels that are insulated or actively heated, as shown in FIGS. 8A to 8D. FIG. 8A shows a double-walled thermally insulated vessel 820A, in which an inner and outer wall, which may be made from the same or differing materials, are separated from each other by an air space. For example, the inner wall could be made of borosilicate glass and the outer wall could be made from tempered glass. FIG. 8B shows a vessel 820B outfitted with a Peltier cooler/heater (thermoelectric heat pump) 832B. FIG. 8C shows a vessel 820C having an insulated jacket 832C, and FIG. 8D shows a vessel 820D in conjunction with heating coils 832D.

FIGS. 9A through 9G show various different types of stands 921A through 921G, respectively, which can be used to accommodate vessels and containers of various sizes and shapes when using a passive metering valve according to the present disclosure.

Figure 10C:
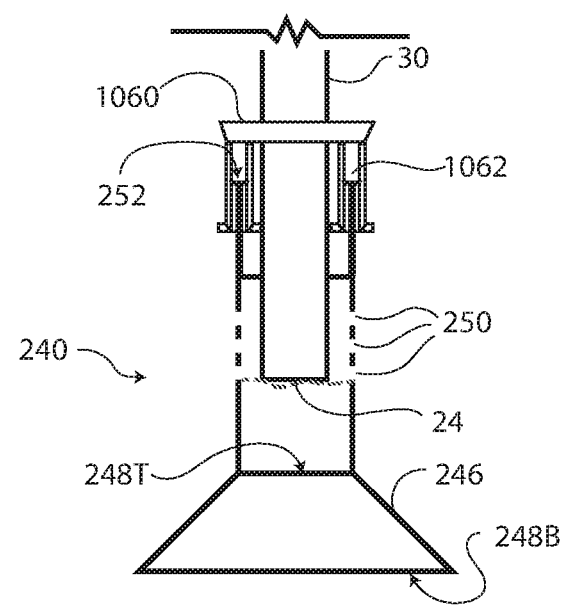
FIG. 10C is a schematic enlargement of the passive metering valve of FIG. 2A in combination with the guide harness of FIGS. 10A and 10B.
Figure 11A:
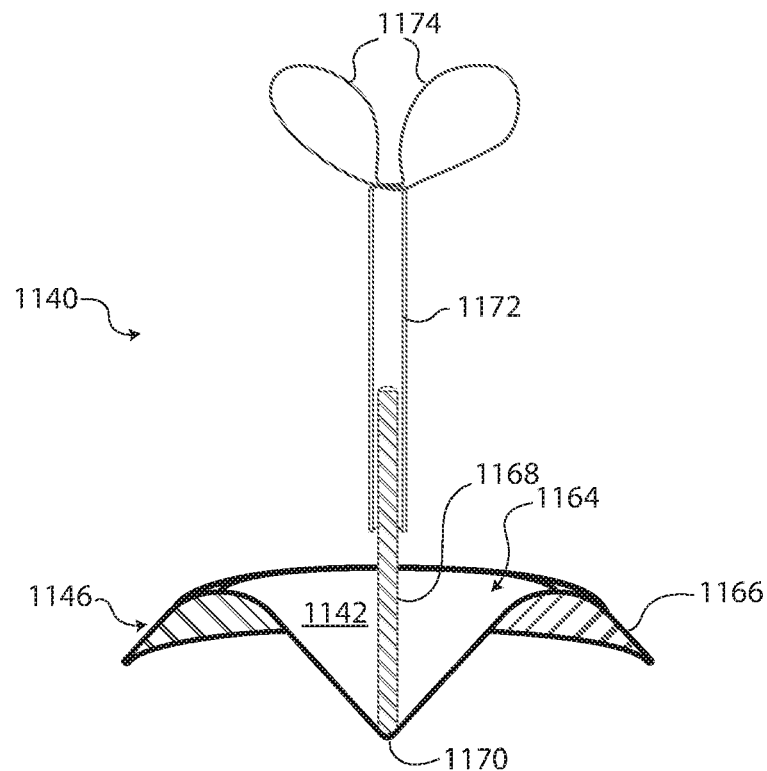
FIG. 11A is a side cross-sectional view of a third exemplary passive metering valve according to an aspect of the present disclosure.
Figure 11B:
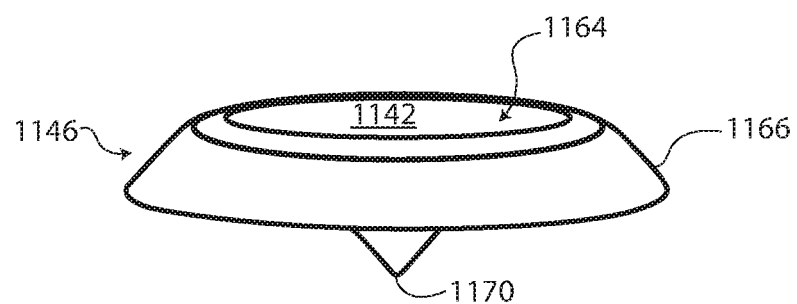
FIG. 11B is a top perspective view of a float portion of the passive metering valve of FIG. 11A.

With reference now to FIGS. 10A to 10C, optionally, a guide harness 1060 may be secured around the neck 30 of the vessel 20 for use with the first exemplary passive metering valve 240, with the open end 252 of the tube 244 being longitudinally movably (e.g. slidably) received in an annular space 1062 formed by the guide harness 1060 so as to maintain alignment between the tube 244 and the neck 30 of the vessel 20 as the passive metering valve 240 reciprocates between the closed configuration (FIG. 10A) and the open configuration (FIG. 10B). The guide harness 1060 may also be used with the second exemplary passive metering valve 540. FIGS. 10A and 10B also show a secondary valve 1028 below the brew basket 12; the secondary valve 1028 could be used, for example, to vary the flow rate from the brew basket 12 into the container 16, allowing for more precise brew times.

Figure 12A:
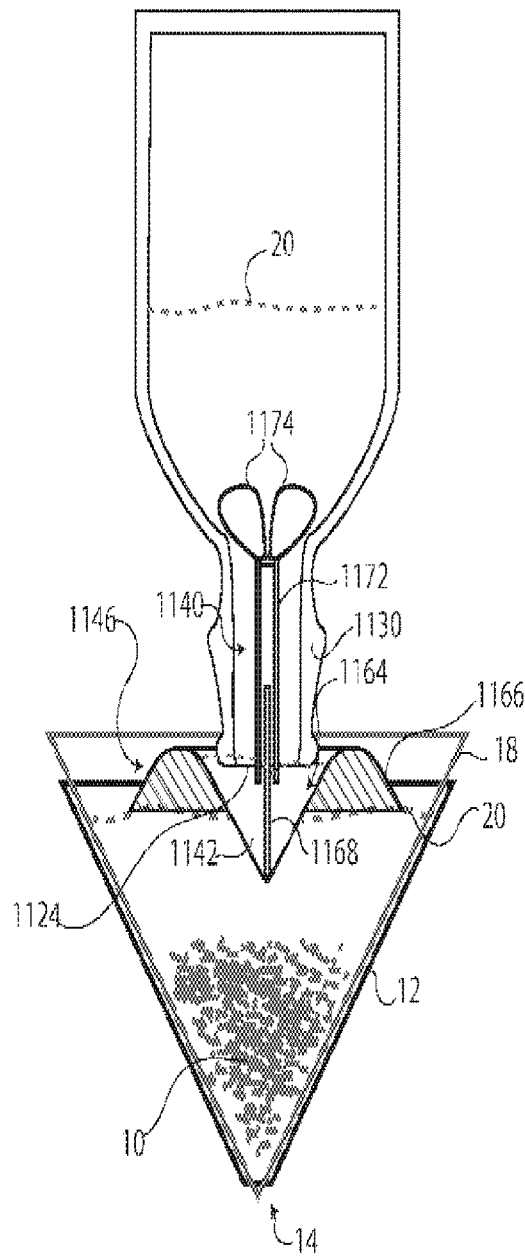
FIGS. 12A and 12B show use of the passive metering valve of FIG. 11A in combination with a vessel for pour-over brewing of coffee.
Figure 12B:
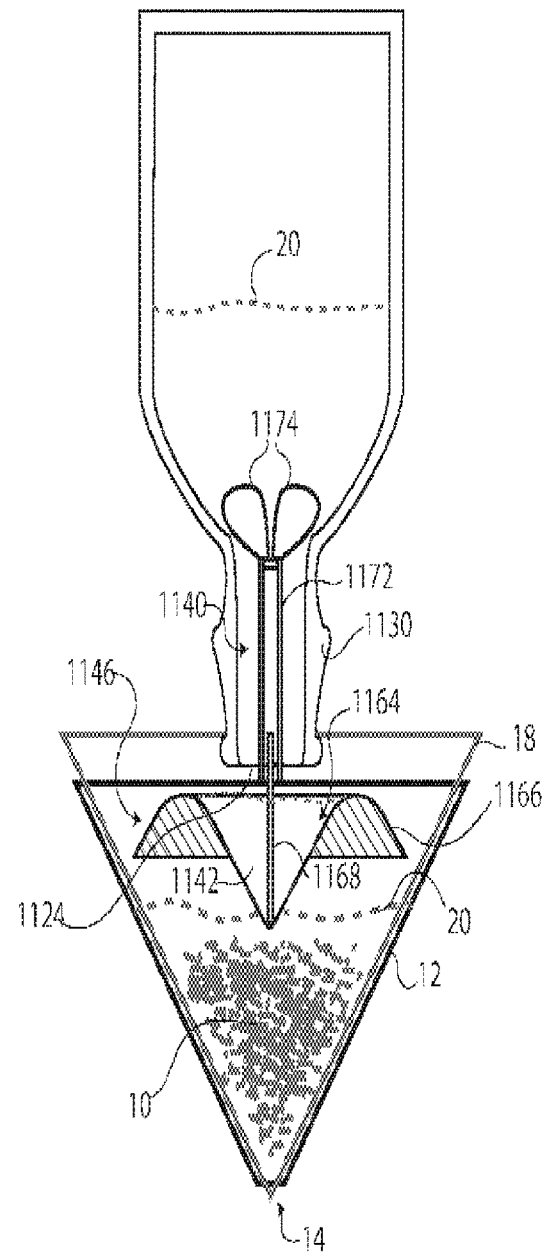

Reference is now made to FIGS. 11A to 12B, which show a third exemplary passive metering valve 1140. In the third exemplary passive metering valve 1140, the float portion 1146 has a generally partially inverted cone shape forming a conical recess 1164 surrounded by an outwardly extending depending skirt 1166. The conical recess 1164 forms the reservoir 1142. A shaft 1168 extends axially from the nadir 1170 of the conical recess 1164 and is longitudinally movably (e.g. slidably) received in the inferior end of a tubular guide 1172. The superior end of the tubular guide 1172 carries a set of retaining members 1174, such as leaf springs, for securely retaining the tubular guide 1172 inside the neck 1130 of an inverted vessel 1120 such as a bottle. This arrangement allows the third exemplary passive metering valve 1140 to reciprocate between the closed configuration (FIG. 12A) and the open configuration (FIG. 12B). In the closed configuration (FIG. 12A), the mouth 1124 of the vessel 1120 is inside the reservoir 1142 formed by the conical recess 1164 so that water 22 in the reservoir 1142 obstructs air from entering the mouth 1124 of the vessel 1120. In the open configuration (FIG. 12B), the mouth 1124 of the vessel 1120 is vertically spaced from the reservoir 1142 formed by the conical recess 1164, permitting air to enter the mouth 1124 of the vessel 1120. Water 22 can overflow the reservoir 1142 formed by the conical recess 1164 and flow along the depending skirt 1166 into the brew basket 12; this provides an overflow path to the brew basket 12.

Reference is now made to FIGS. 13A to 14B, in which a fourth exemplary passive metering valve is indicated generally at 1340. Similarly to the first exemplary passive metering valve 240, in the fourth exemplary passive metering valve 1340, the reservoir 1342 is formed by a tube 1344 depending from and sealed off from a float portion 1346. Unlike in the first exemplary passive metering valve 240, in the fourth exemplary passive metering valve 1340, the float portion 1346 is cylindrical in shape. The float portion 1346 may have an open bottom so as to achieve flotation by way of trapped air, or may be a hollow, air-filled element or a solid block of buoyant material. As with the first exemplary passive metering valve 240, in the fourth exemplary passive metering valve 1340 the tube 1344 has a plurality of water drainage apertures 1350 longitudinally spaced from the float portion 1346, and the end 1352 of the tube 1344 that is remote from the float portion 1346 is open for receiving water 22 from a vessel 1320. The portion of the tube 1344 between the float portion 1346 and the water drainage apertures 1350 defines the reservoir 1342. The assembly made up of the tube 1344 and the float portion 1346 is longitudinally movably (e.g. slidably) received within an annular guide 1372 which is secured coaxially around the neck 1330 of a vessel 1320, for example by a resilient collar 1376, and extends into the brew basket 12. The neck 1330 of the vessel 1320 extends into the open end 1352 of the tube 1344, and the wall of the tube 1344 fits in the annular space between the guide 1372 and the neck 1330 of the vessel 1320, so that the assembly (the tube 1344 and the float portion 1346) can reciprocate, relative to the neck 1330 of the vessel 1320, between the closed configuration (FIG. 14A) and the open configuration (FIG. 14B). In the closed configuration (FIG. 14A), the mouth 1324 of the vessel 1320 is inside the reservoir 1342 so that water 22 in the reservoir 1342 obstructs air from entering the mouth 1324 of the vessel 1320. In the open configuration (FIG. 14B), the mouth 1324 of the vessel 1320 is above the reservoir 1342, permitting air to enter the mouth 1324 of the vessel 1320. Water 22 can overflow the reservoir 1342 through the water drainage apertures 1350, and longitudinally extending drainage channels 1378 may be formed on the interior surface of the guide 1372 to facilitate drainage into the brew basket 12 while still permitting the assembly (the tube 1344 and the float portion 1346) to be slidably received within the guide 1372. Thus, an overflow path to the brew basket 12 is provided.

Figure 15:
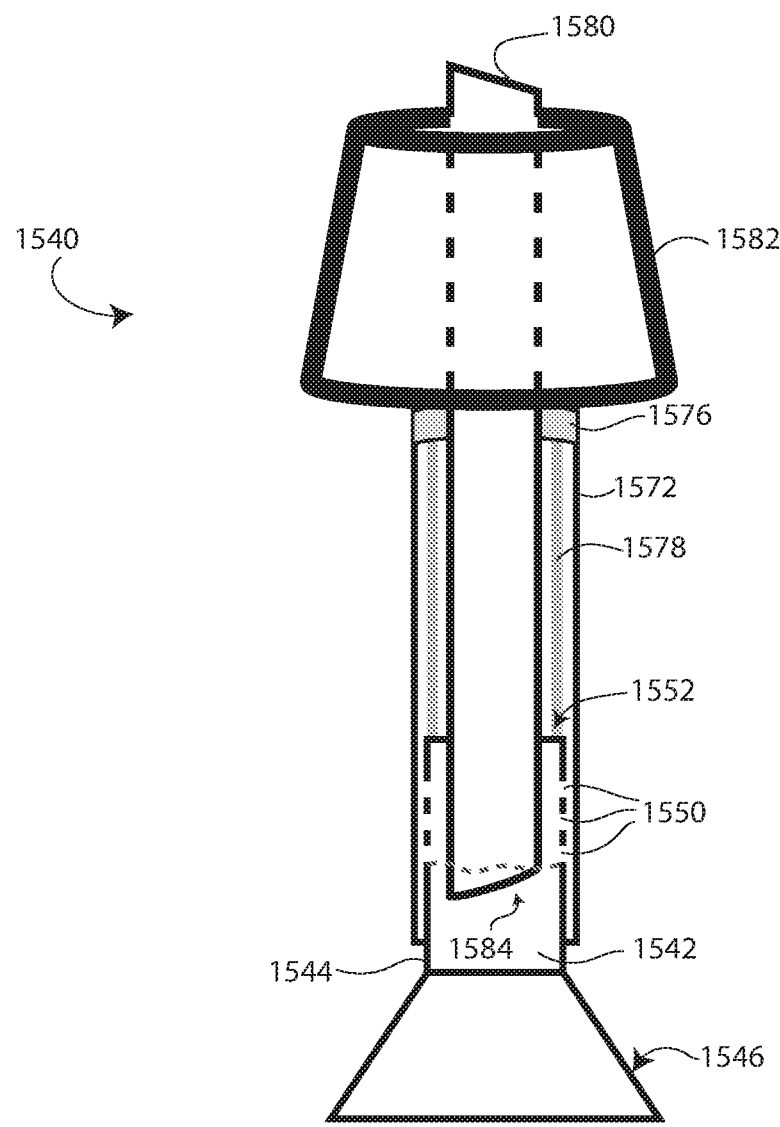
FIG. 15 is a partially exposed view of a fifth exemplary passive metering valve according to an aspect of the present disclosure.
Figures 16A, 16B:
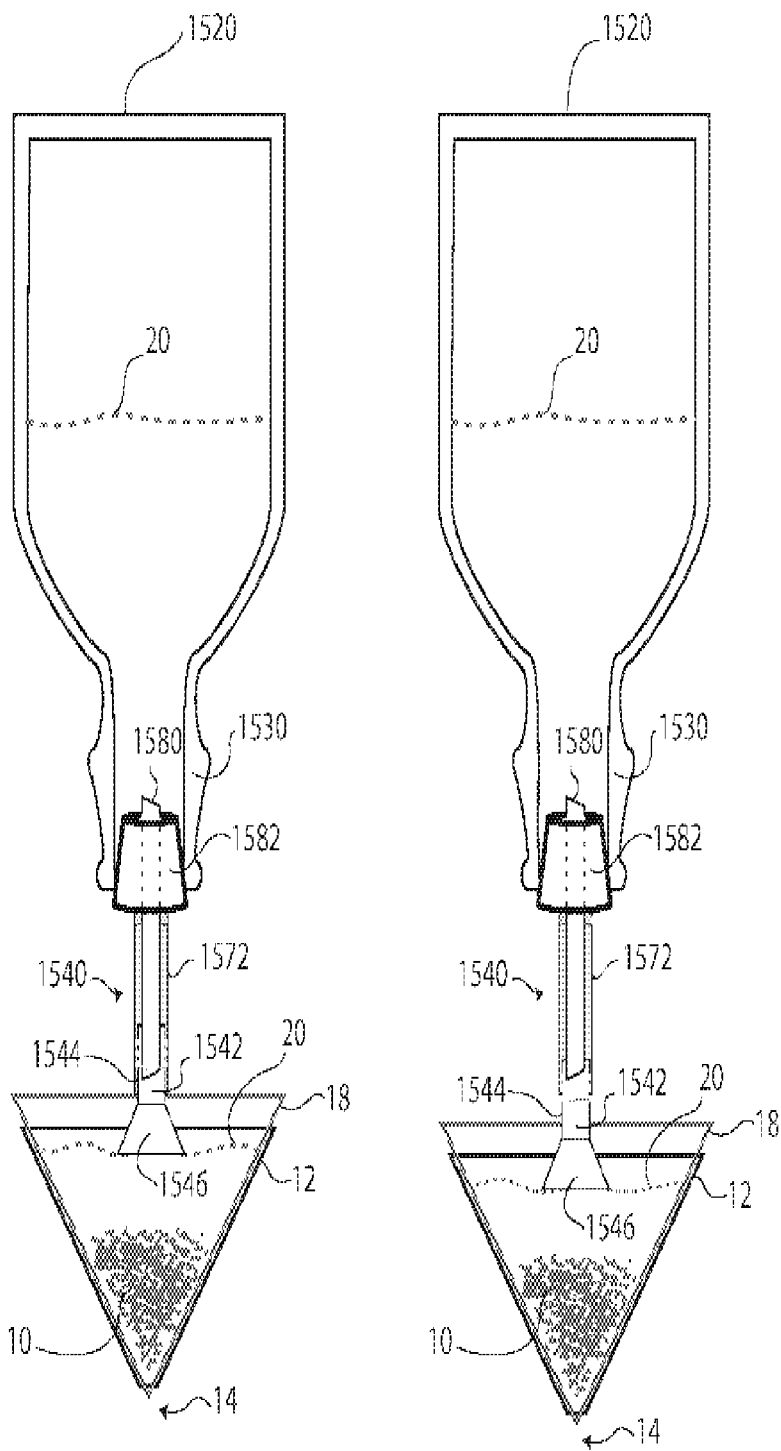
FIGS. 16A and 16B show use of the passive metering valve of FIG. 15 in combination with a vessel for pour-over brewing of coffee.

With reference now to FIGS. 15 to 16B, a fifth exemplary passive metering valve is indicated generally at 1540. Several aspects of the fifth exemplary passive metering valve 1540 are similar to the fourth exemplary passive metering valve 1340. As with the fourth exemplary passive metering valve 1340, in the fifth exemplary passive metering valve 1540, the reservoir 1542 is formed by a tube 1544 depending from and sealed off from a float portion 1546. Unlike in the fourth exemplary passive metering valve 1340, the float portion 1546 is frusto-conical in shape with an open bottom, similar to the first exemplary passive metering valve 240, so as to achieve flotation by way of trapped air. In other embodiments, the float portion may be a hollow, air-filled element or a solid block of buoyant material. The tube 1544 has a plurality of water drainage apertures 1550 longitudinally spaced from the float portion 1546, and the end 1552 of the tube 1544 that is remote from the float portion 1546 is open for receiving water 22 from a vessel 1520. The reservoir 1542 is defined by the portion of the tube 1544 between the float portion 1546 and the water drainage apertures 1550. The tube 1544 is longitudinally movably (e.g. slidably) received within an annular guide 1572 which is secured coaxially around a drain conduit 1580 extending through a stopper 1582 that is friction fit inside the neck 1530 of a vessel 1520. The annular guide 1572 may be secured coaxially around the drain conduit 1580 by, for example, a resilient collar 1576, and extends into the brew basket 12. The drain conduit 1580 extends into the tube 1544, and the wall of the tube 1544 fits in the annular space between the guide 1572 and the drain conduit 1580, so that the assembly (the tube 1544 and the float portion 1546) can reciprocate, relative to the vessel 1520, between the closed configuration (FIG. 16A) and the open configuration (FIG. 16B). In the closed configuration (FIG. 16A), the mouth 1584 of the drain conduit 1580 is inside the reservoir 1542 so that water 22 in the reservoir 1542 obstructs air from entering the mouth 1584 of the drain conduit 1580 and hence from entering the vessel 1520. In the open configuration (FIG. 16B), the mouth 1584 of the drain conduit 1580 is above the reservoir 1542, permitting air to enter the mouth 1584 of the drain conduit 1580 and flow therethrough into the vessel 1520. Water 22 can overflow the reservoir 1542 through the water drainage apertures 1550, and longitudinally extending drainage channels 1578 may be formed on the interior surface of the guide 1572 to facilitate drainage while still permitting the tube 1544 to be slidably received within the guide 1572. Thus, an overflow path to the brew basket 12 is provided.

Figures 17A, 17B:
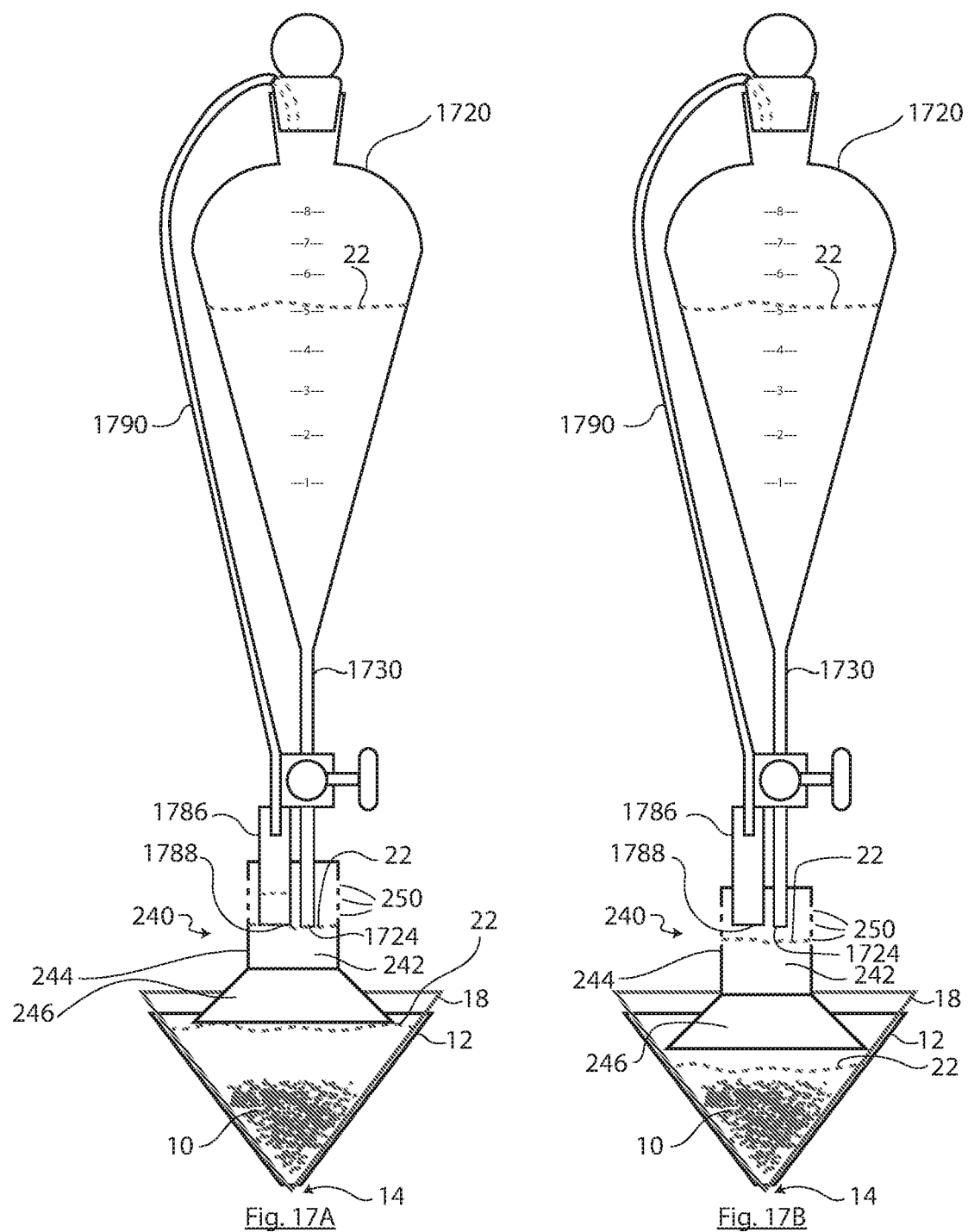
FIGS. 17A and 17B show an adaptation to facilitate use of a passive metering valve according to the present disclosure with a vessel whose neck is too narrow to permit effective passage of air therethrough into the vessel.

Reference is now made to FIGS. 17A and 17B, which show an adaptation to facilitate use of a passive metering valve according to the present disclosure with a vessel 1720 whose neck 1730 is too narrow to permit effective passage of air therethrough into the vessel 1720. Simply for purposes of illustration, the first exemplary passive metering valve 240 is shown in FIGS. 17A and 17B; the adaptation shown may be used with other suitable passive metering valves according to the present disclosure. In the adaptation shown in FIGS. 17A and 17B, an air inlet tube 1786 is positioned with its mouth 1788 in vertical registration with the mouth 1724 of the vessel 1720, and connected via an air intake conduit 1790 in fluid communication with the interior of the vessel 1720.

In FIG. 17A, the first exemplary passive metering valve 240 is in the closed configuration; the water drainage apertures 250 are positioned above the mouth 1724 of the vessel 1720 such that the mouth 1788 of the air inlet tube 1786 will interface with the surface of the water 22 in the tube 244. This interface between the mouth 1724 of the vessel 1720 and the surface of the water 22 in the tube 244 prevents air from entering the mouth 1788 of the air inlet tube 1786 and hence from entering the vessel 1720 to displace water 22 from therein, thereby stopping the flow of water 22 from the vessel 1720. In FIG. 17B, the first exemplary passive metering valve 240 is in the open configuration; at least some of the water drainage apertures 250 are below the mouth 1788 of the air inlet tube 1786, so water can flow from the mouth 1724 of the vessel 1720 into the tube 244 (since air can enter the tube via the water drainage apertures 250, flow the into mouth 1788 of the air inlet tube 1786, through the air intake conduit 1790 and then into the vessel 1720 to displace the water 22).

Figure 18:
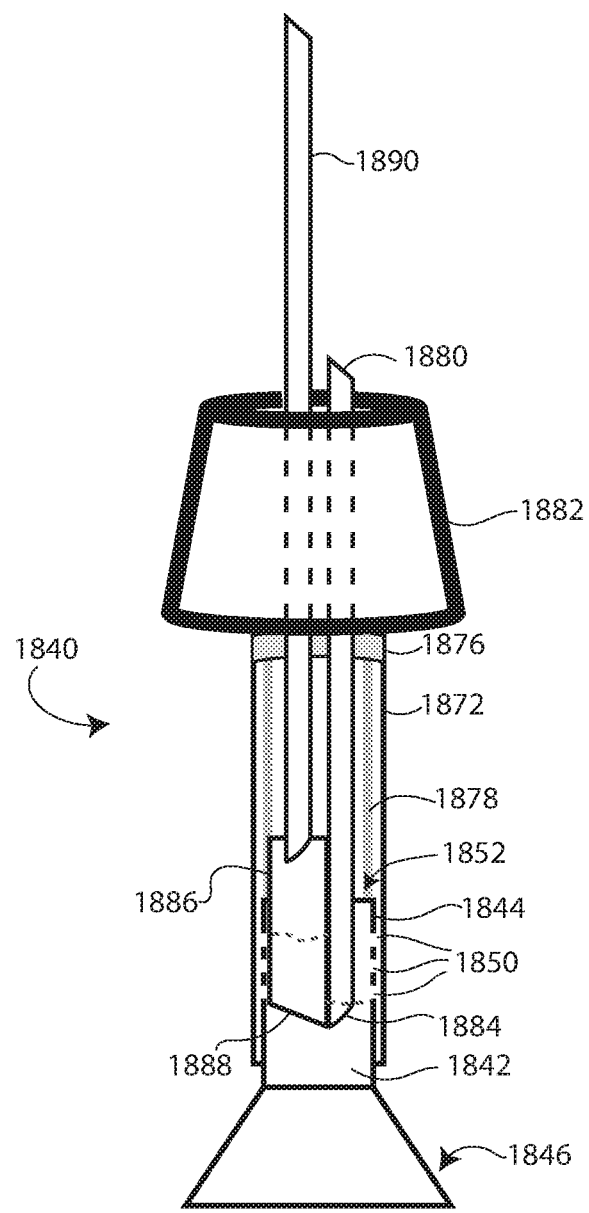
FIG. 18 shows a partially exposed view of a sixth exemplary passive metering valve according to an aspect of the present disclosure.
Figures 19A, 19B:
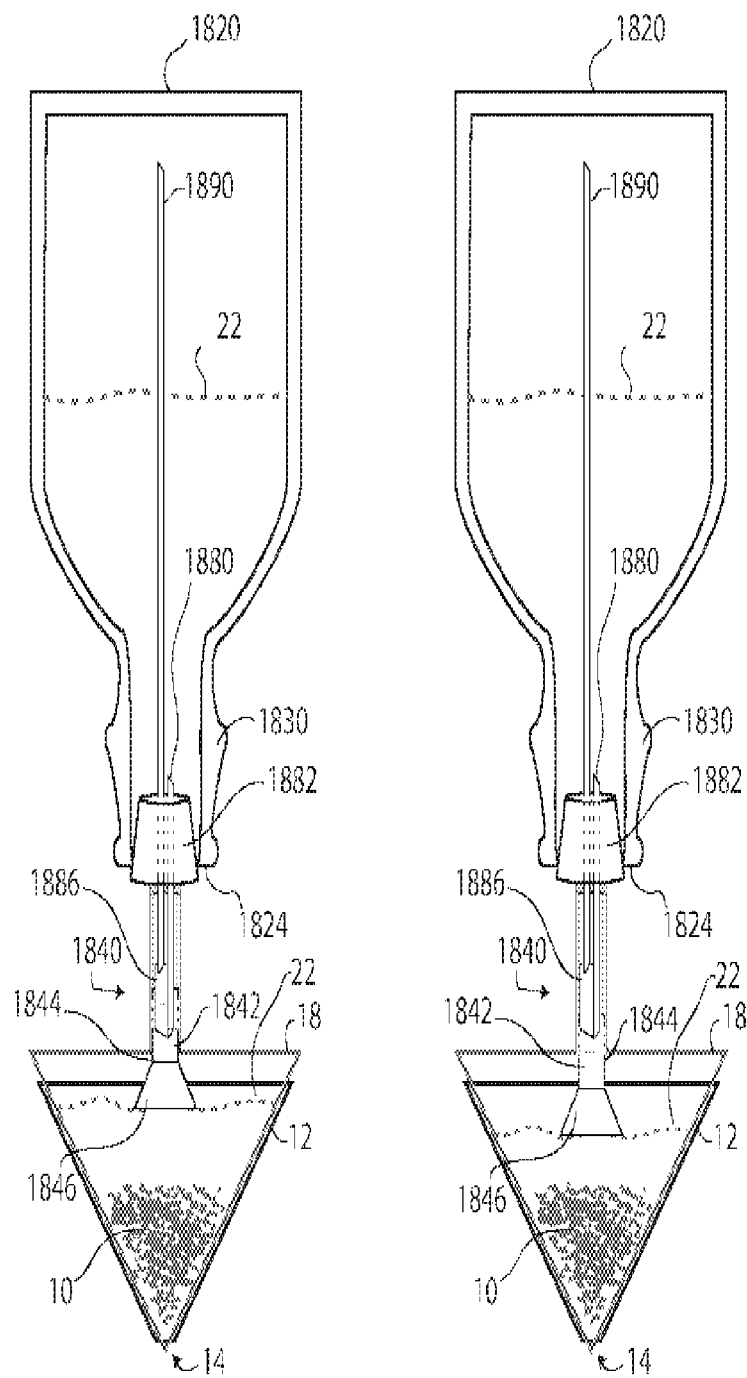
FIGS. 19A and 19B show use of the passive metering valve of FIG. 15 in combination with a vessel for pour-over brewing of coffee.
Figures 20A, 20B, 20C:
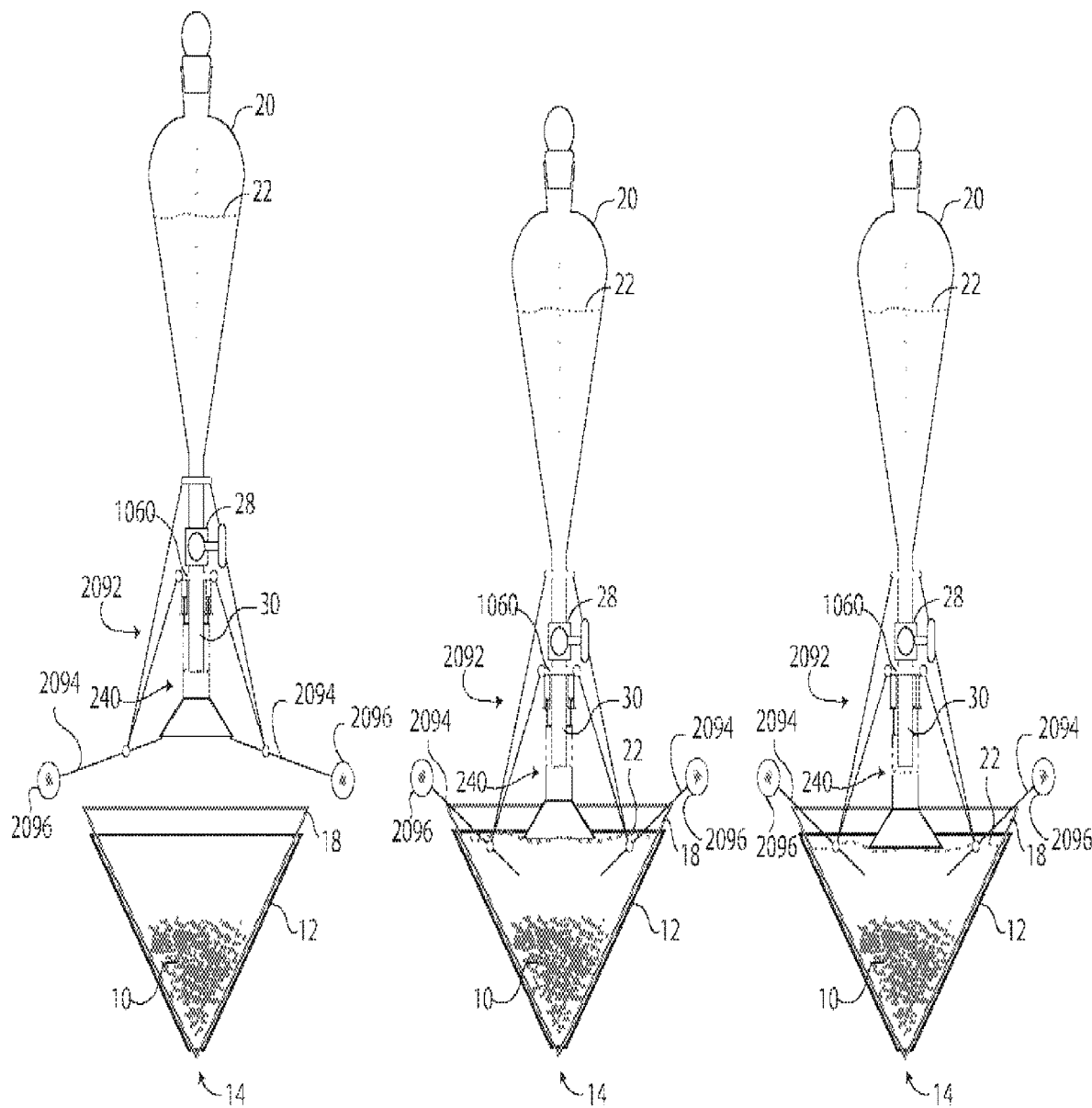
FIGS. 20A, 20B, 20C, 21A, and 22A show, in schematic form, a first exemplary locking mechanism which may be used, in conjunction with a guide harness, with suitable passive metering valves according to aspects of the present disclosure.
Figure 21A:
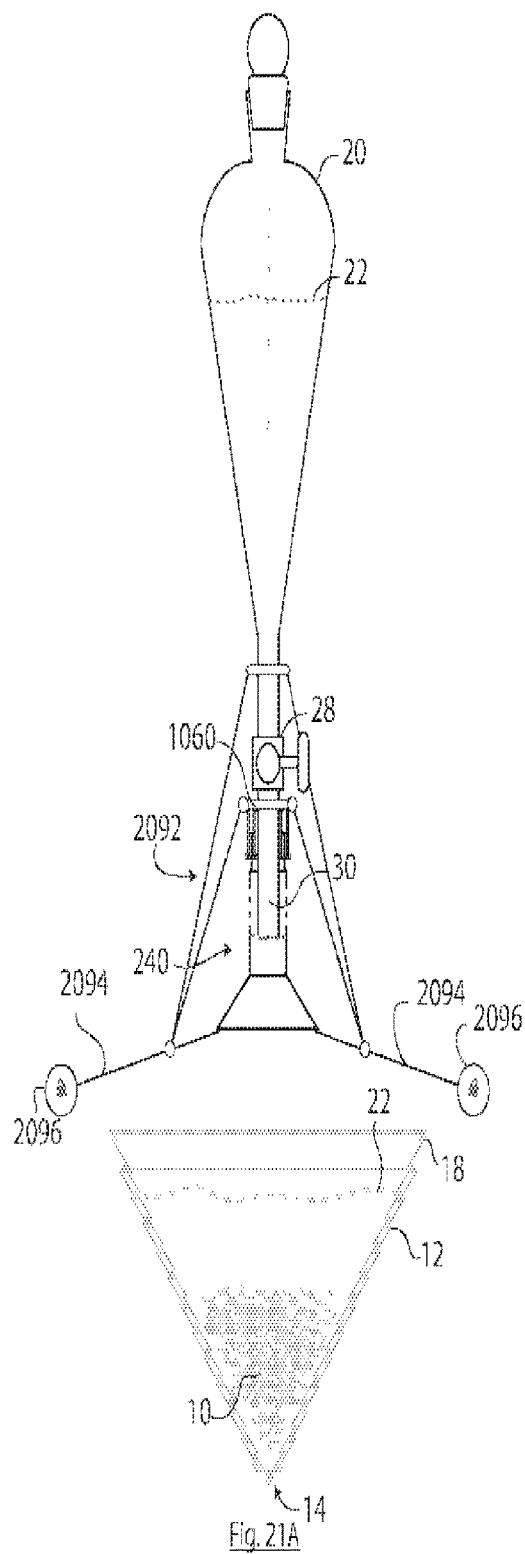

FIGS. 18 through 19B illustrate a sixth exemplary passive metering valve 1840, which is a modified version of the fifth exemplary passive metering valve 1540 to incorporate the adaptation shown in FIGS. 17A and 17B. The structure of the sixth exemplary passive metering valve 1840, is similar to that of the fifth exemplary passive metering valve 1540, with like reference numerals denoting like features but with the prefix "18" instead of "15". In the sixth exemplary passive metering valve 1840, the drain conduit 1880 is narrower, and an air inlet tube 1886 is positioned inside the guide 1872 alongside the drain conduit 1880. The mouth 1888 of the air inlet tube 1886 is in vertical registration with the mouth 1884 of the drain conduit 1880, and an air intake conduit 1890 extends through the stopper 1882 to couple the air inlet tube 1886 in fluid communication with the interior of the vessel 1820. As can be seen in FIGS. 19A and 19B, the air intake conduit 1890 extends past the surface of the water 22 in the vessel 1820 into the air pocket thereabove. FIG. 19A shows the sixth exemplary passive metering valve 1840 in the closed configuration; the water drainage apertures 1850 are above the mouth 1888 of the air inlet tube 1886 such that the mouth 1888 of the air inlet tube 1886 will interface with the surface of the water 22 in the tube 1844. This prevents air from entering the vessel 1820 to displace water 22 from therein by preventing air from entering the mouth 1888 of the air inlet tube 1886. FIG. 19B shows the sixth exemplary passive metering valve 1840 in the open configuration with at least some of the water drainage apertures 1850 below the mouth 1888 of the air inlet tube 1886. This allows air to enter the tube 1844 via the water drainage apertures 1850, flow into the mouth 1888 of the air inlet tube 1886, through the air intake conduit 1890 and then into the vessel 1820 to displace the water 22.

Figure 22A:
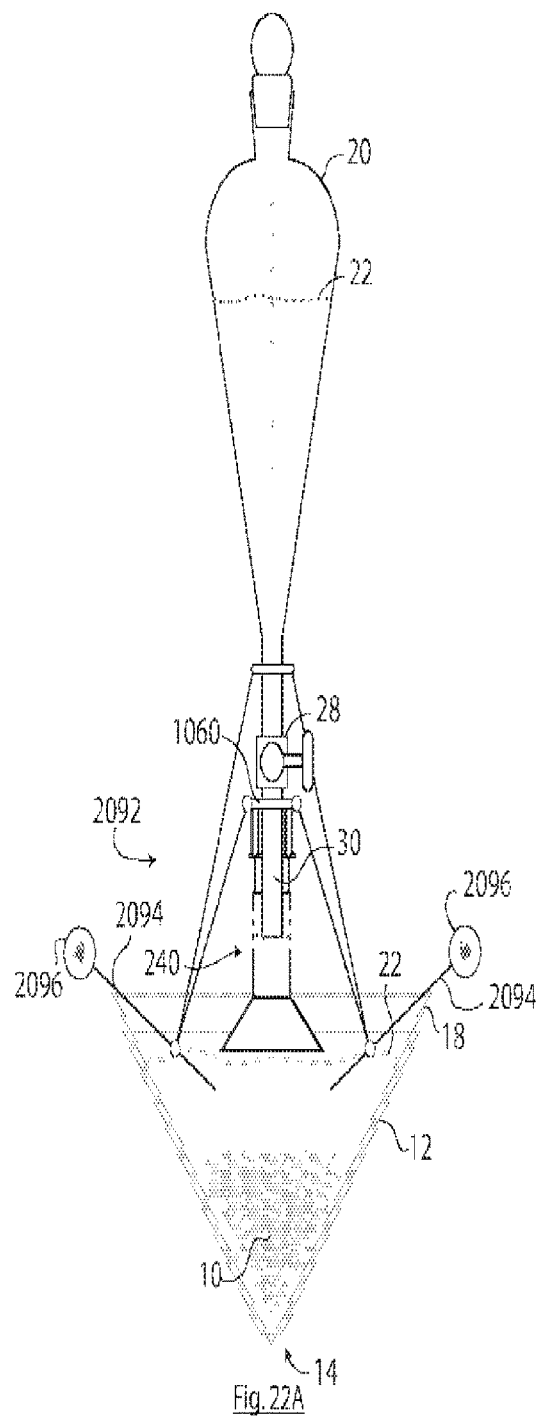
Figure 24A:
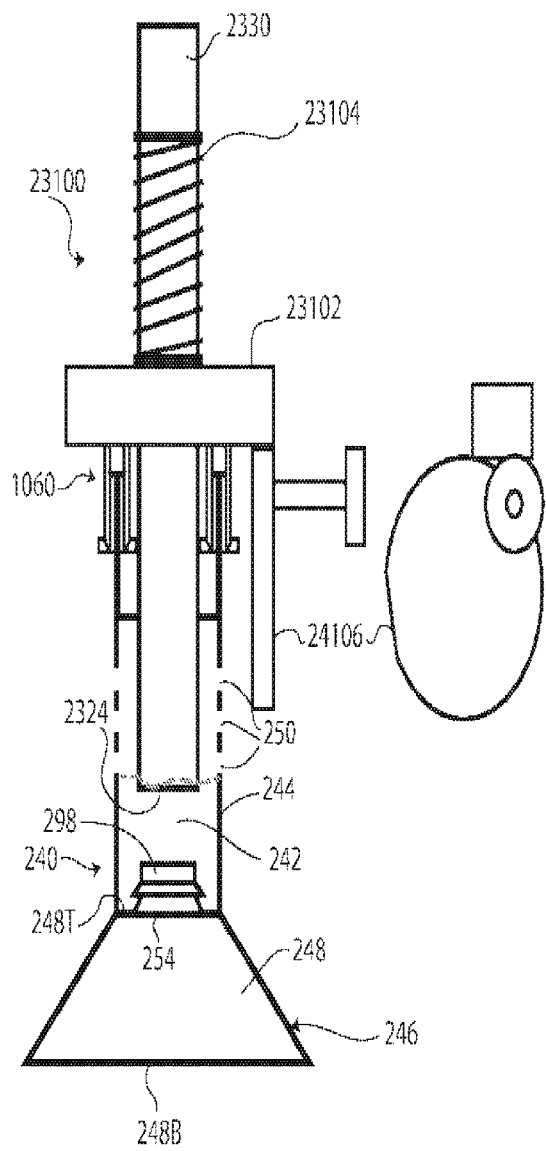
FIGS. 24A and 24B show a second variant of a second exemplary locking mechanism incorporating a rotary cam actuator and which may be used, in conjunction with a guide harness, with suitable passive metering valves according to aspects of the present disclosure.
Figure 24B:
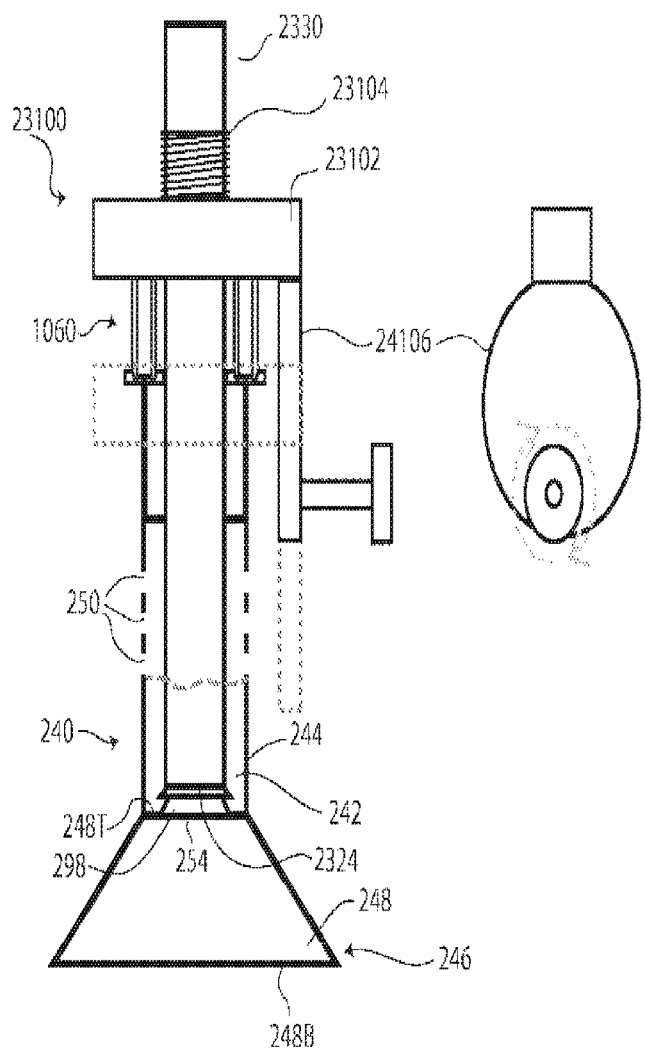

Reference is now made to FIGS. 20A through 22A, which show, in schematic form, a locking mechanism which may be used, in conjunction with a guide harness, with suitable passive metering valves according to the present disclosure. For purposes of illustration, FIGS. 20A through 22A show the locking mechanism, denoted generally by reference 2092, used in conjunction with the exemplary guide harness 1060 shown in FIGS. 10A and 10B and the first exemplary passive metering valve 240. As noted above, the guide harness 1060 is secured around the neck 30 of the vessel 20, with the open end 252 of the tube 244 being longitudinally movably (e.g. slidably) received in an annular space 1062 formed by the guide harness 1060 so as to maintain alignment between the tube 244 and the neck 30 of the vessel 20 as the passive metering valve 240 reciprocates between the closed configuration (FIG. 20B) and the open configuration (FIG. 20C). The locking mechanism 2092 comprises a plurality of support arms 2094 that are pivotally carried by the vessel 20 and configured to pivot between a support position (FIGS. 20A and 21A) and a release position (FIGS. 20B, 20C and 22A). In the support position, the support arms 2094 support the passive metering valve 240 in the closed configuration, and in the release position, the support arms 2094 leave the passive metering valve 240 free to reciprocate between the closed configuration (FIG. 20B) and the open configuration (FIG. 20C). The support arms 2094 are biased toward the support position, and are arranged so that positioning the passive metering valve 240 in the brew basket 12 will overcome the bias and move the support arms into the release position. In the illustrated embodiment, this is achieved by way of weights 2096 disposed on the ends of the support arms 2094 opposite the ends of the support arms 2094 that support the passive metering valve 240. When the passive metering valve 240 is outside the brew basket 12, the weights 2096 keep the support arms 2094 pivoted into the support position; when the passive metering valve 240 placed in the brew basket 12, the edges of the brew basket 12 engage the support arms 2094 between the weights 2096 and the pivot points, overcoming the weight and pivoting the support arms 2094 into the release position. This is merely one example of a mechanical locking mechanism.

Figure 25A:
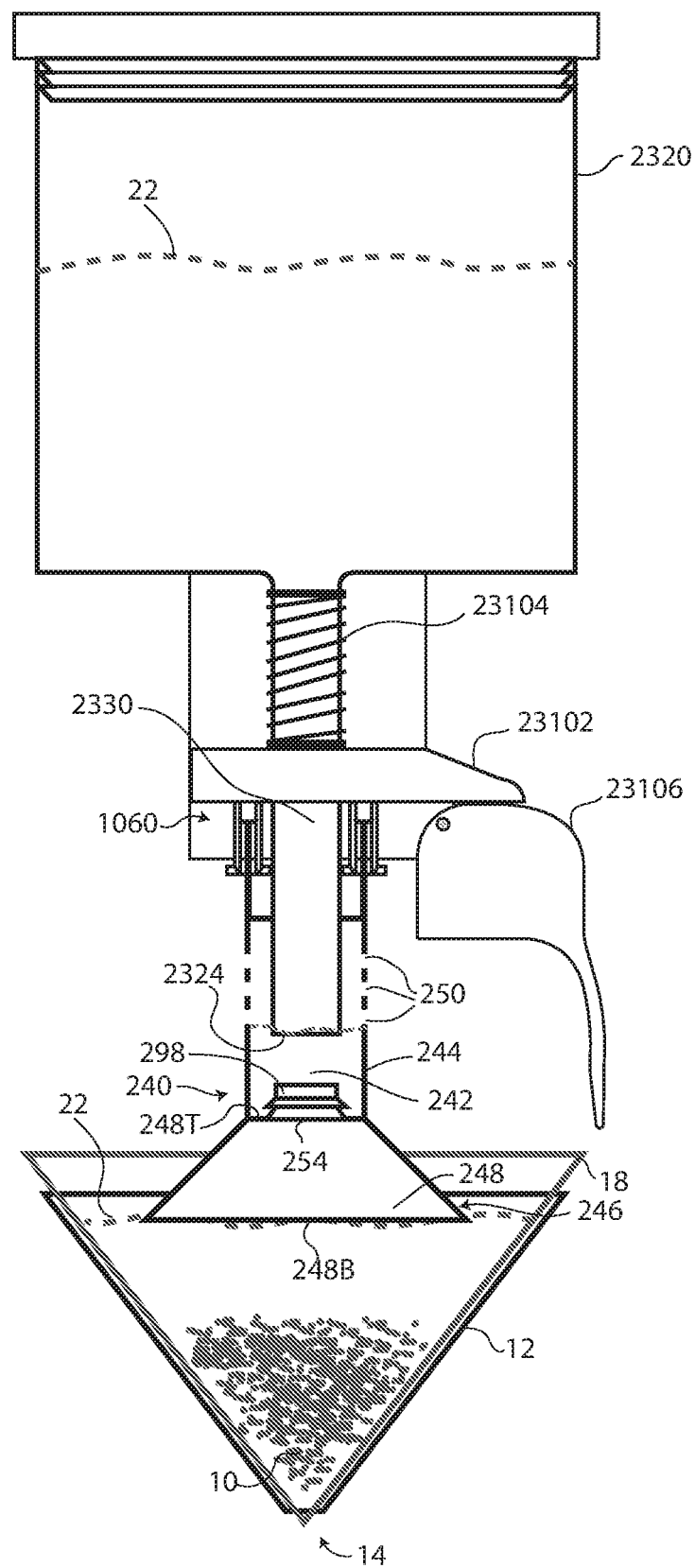
FIGS. 25A, 25B, and 25C show use of the first variant of the second exemplary locking mechanism shown in FIGS. 23A and 23B in combination with a vessel for pour-over brewing of coffee.
Figure 25B:
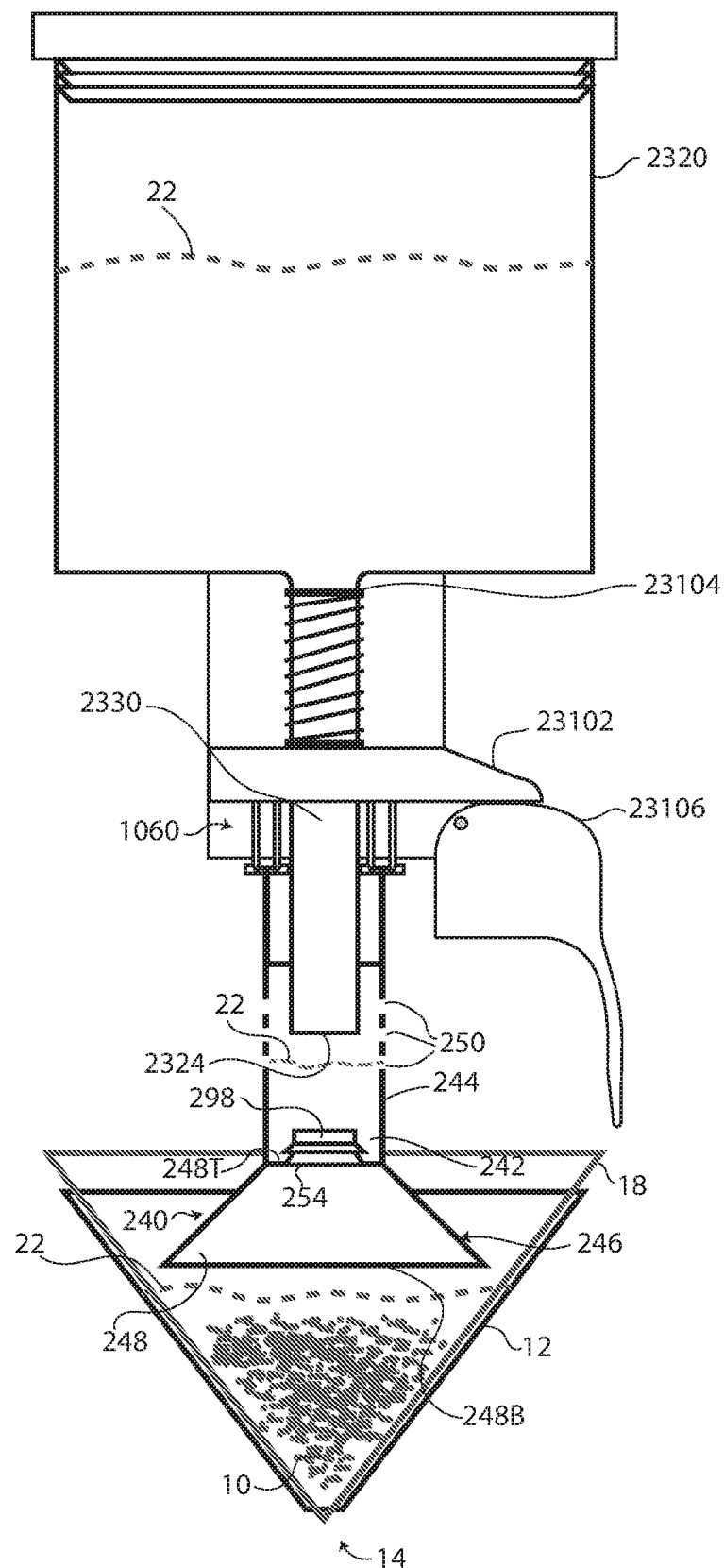
Figure 25C:
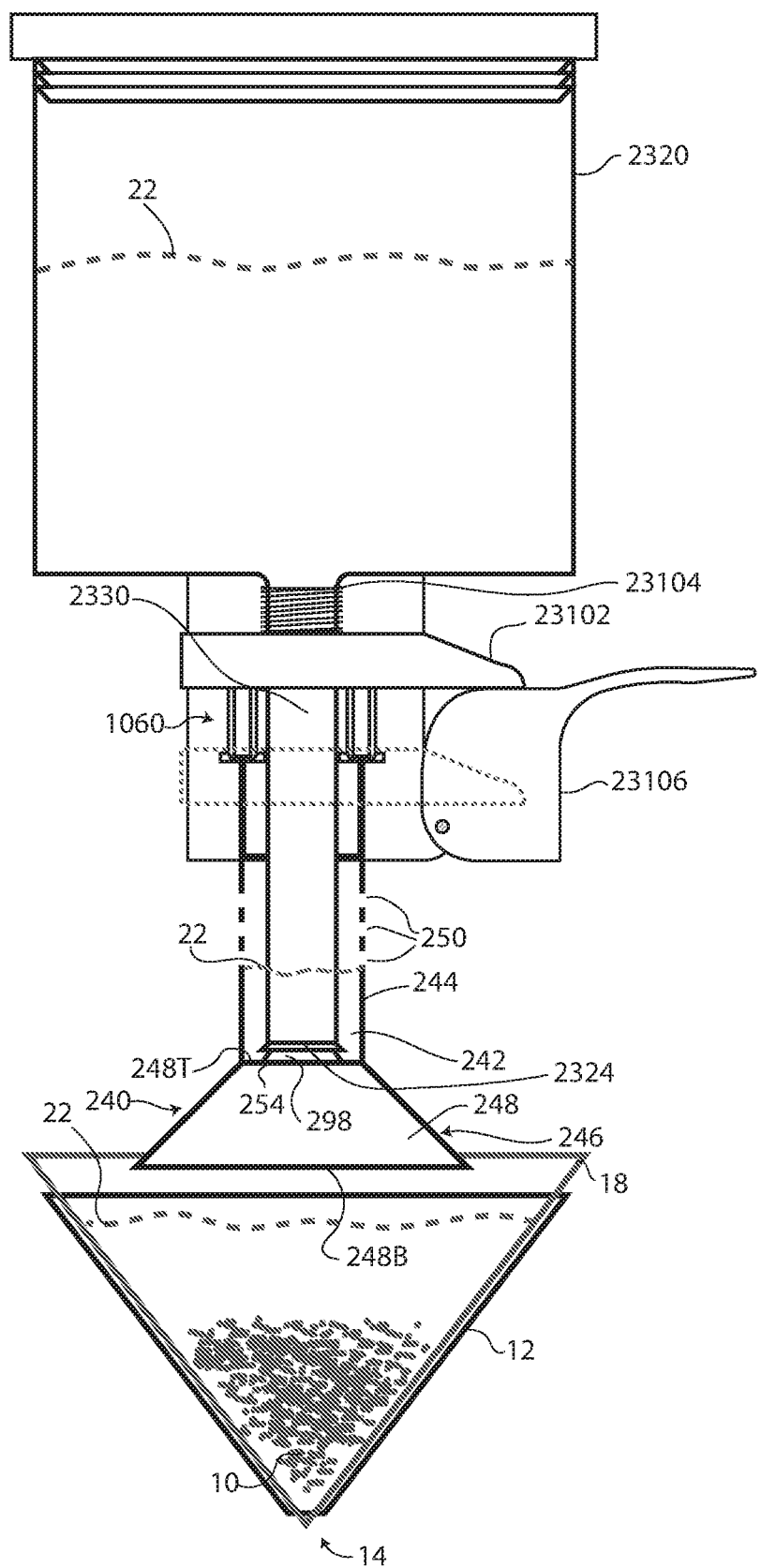
Figures 26A, 26B, 26C:
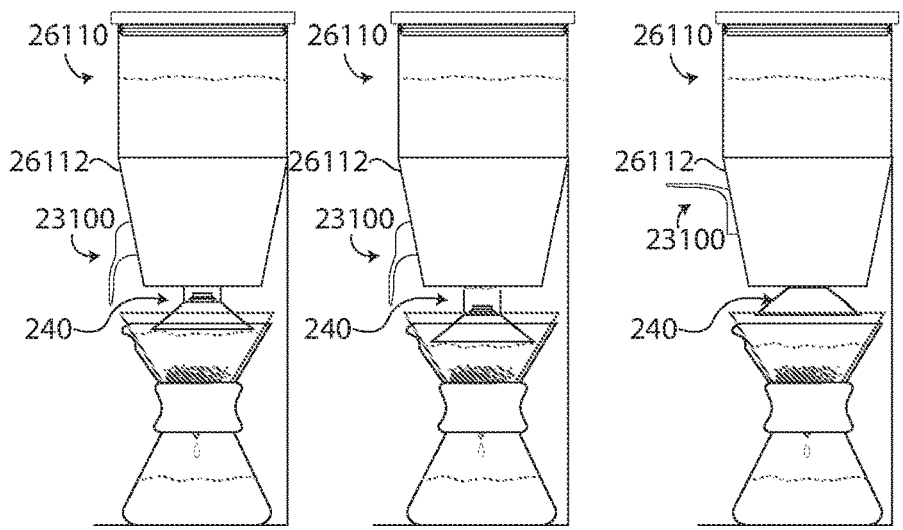
FIGS. 26A, 26B, 26C, 27A, 27B, 27C, 28A, 28B, and 28C show the passive metering valve of FIG. 2A, guide harness of FIGS. 10A and 10B and the first variant of the second exemplary locking mechanism shown in FIGS. 23A and 23B incorporated into a coffee brewing system.
Figures 27A, 27B, 27C:
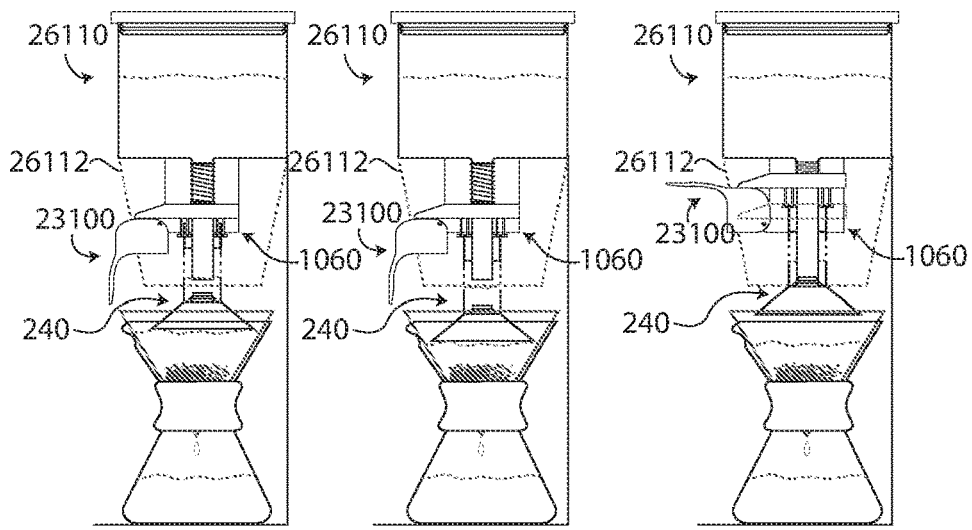
Figures 28A, 28B, 28C:
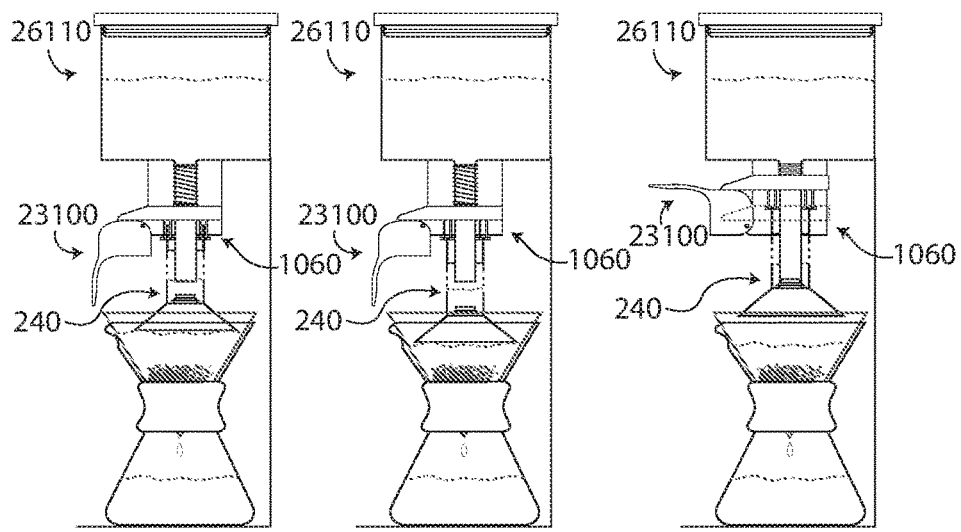

Another type of locking mechanism is shown in FIGS. 23A to 25C. For illustrative purposes, FIGS. 23A to 24B show the locking mechanism in use with a guide harness 1060 of the type shown in FIGS. 10A and 10B and the first exemplary passive metering valve 240, modified to include a plug 298 at the closed end 254 of the tube 244. The locking mechanism shown in FIGS. 23A to 24B is denoted generally by reference 23100, with FIGS. 23A, 23B and 25A to 25C showing a first variant thereof and FIGS. 24A and 24B showing a second variant thereof. The locking mechanism 23100 comprises a support plate 23102, biasing member (in the illustrated embodiment a spring) 23104 and cam actuator 23106, 24106. The two variants differ in the type of cam actuator used, the cam actuator 23106 shown in the variant of FIGS. 23A and 23B is a lever cam actuator and the cam actuator 24106 shown in the variant of FIGS. 24A and 24B is a rotary cam actuator. The guide harness 1060 is carried by the support plate 23102, and the open end of the tube 244 of the passive metering valve 240 is retained in the guide harness 1060 so that the passive metering valve 240 can reciprocate between the open configuration and the closed configuration. The neck 2330 of the vessel 2320 (not shown in FIGS. 23A to 24B) extends through an aperture in the support plate 23102, through the guide harness 1060 and into the tube 244. The biasing member 23104 acts between the support plate 23102 and the vessel to urge the support plate 23102 toward the mouth 2324 of the vessel, and the cam actuator 23106, 24106 acts as a stop to limit travel of the support plate 23102 toward the mouth 2324 of the vessel. The cam actuator 23106, 24106 is movable between an unlocked position (FIGS. 23A and 24A) and a locked position (FIGS. 23B and 24B). With the cam actuator 23106, 24106 in the unlocked position, the support plate 23102 is closer to the mouth 2324 of the vessel than in the locked position, and in the unlocked position the passive metering valve 240 can freely reciprocate between the open configuration (FIG. 25B) and the closed configuration (FIG. 25A) while the mouth 2324 of the vessel remains spaced from the plug 298 at the closed end 254 of the tube 244. However, when the cam actuator 23106, 24106 is moved into the locked position, the passive metering valve 240 is drawn along the neck 2330 of the vessel 2320, bringing the plug 298 into engagement with the mouth 2324 of the vessel to seal the mouth 2324 of the vessel 2320 (FIGS. 23B, 24B, 25C). The cam actuator 23106, 24106 is shaped to remain in the locked position unless actively moved. While in the illustrated embodiments the neck 2330 of the vessel extends through an aperture in the support plate 23102, in other embodiments a separate drainage conduit may extend through the support plate and the mouth of the vessel may be coupled in fluid communication with the drainage conduit. FIGS. 26A through 28C show the passive metering valve 240, guide harness 1060 and locking mechanism 23100 of FIGS. 23A and 24A incorporated into a coffee brewing system 26110 which includes a shroud 26112 to conceal the mechanism (FIGS. 28A through 28C show the shroud removed). FIGS. 26A, 27A and 28A show the passive metering valve 240 in the closed configuration, FIGS. 26B, 27B and 28B show the passive metering valve 240 in the open configuration and FIGS. 26C, 27C and 28C show the passive metering valve 240 in the locked configuration. The locked configuration allows the vessel to be filled with water.

Figure 29A:
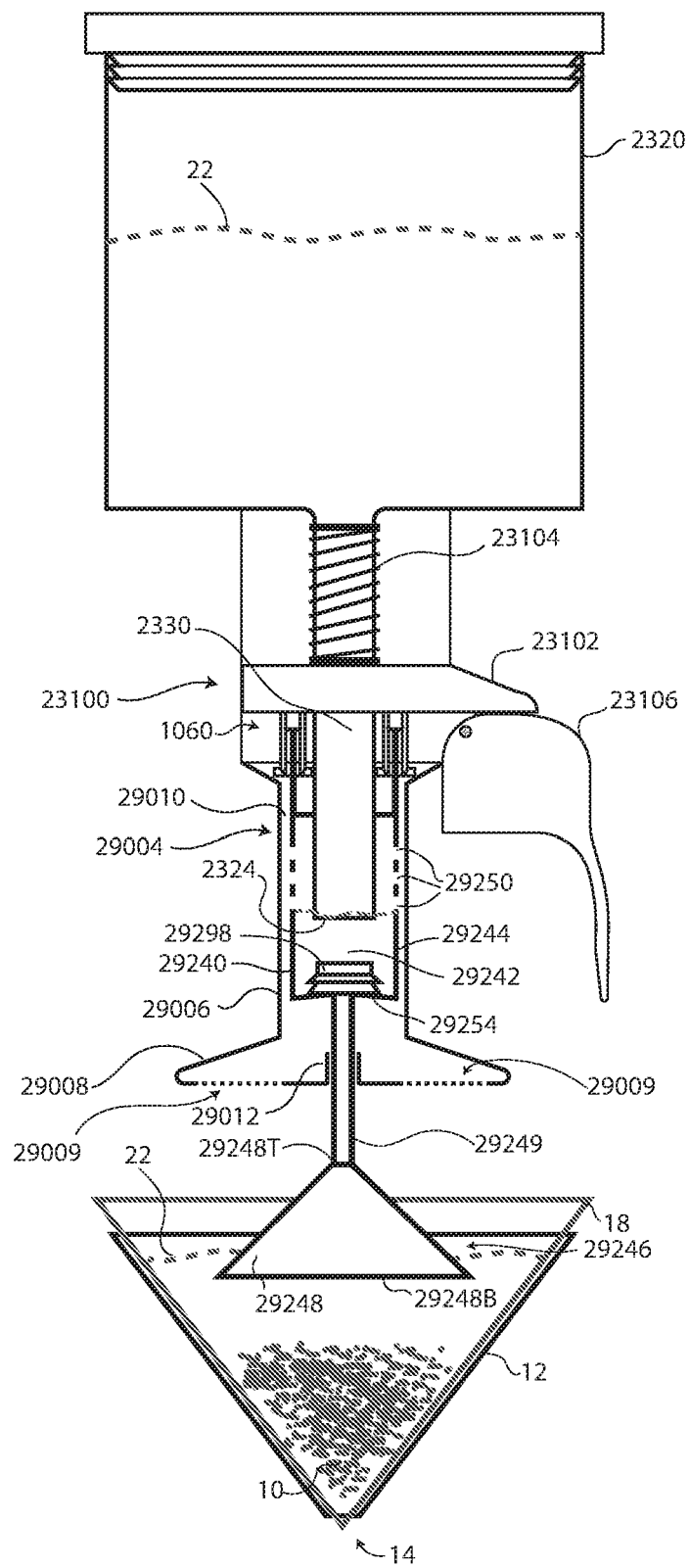
FIGS. 29A, 29B and 29C show use of the first variant of the second exemplary locking mechanism shown in FIGS. 23A and 23B with a seventh exemplary passive metering valve according to an aspect of the present disclosure, in combination with a vessel for pour-over brewing of coffee.
Figure 29B:
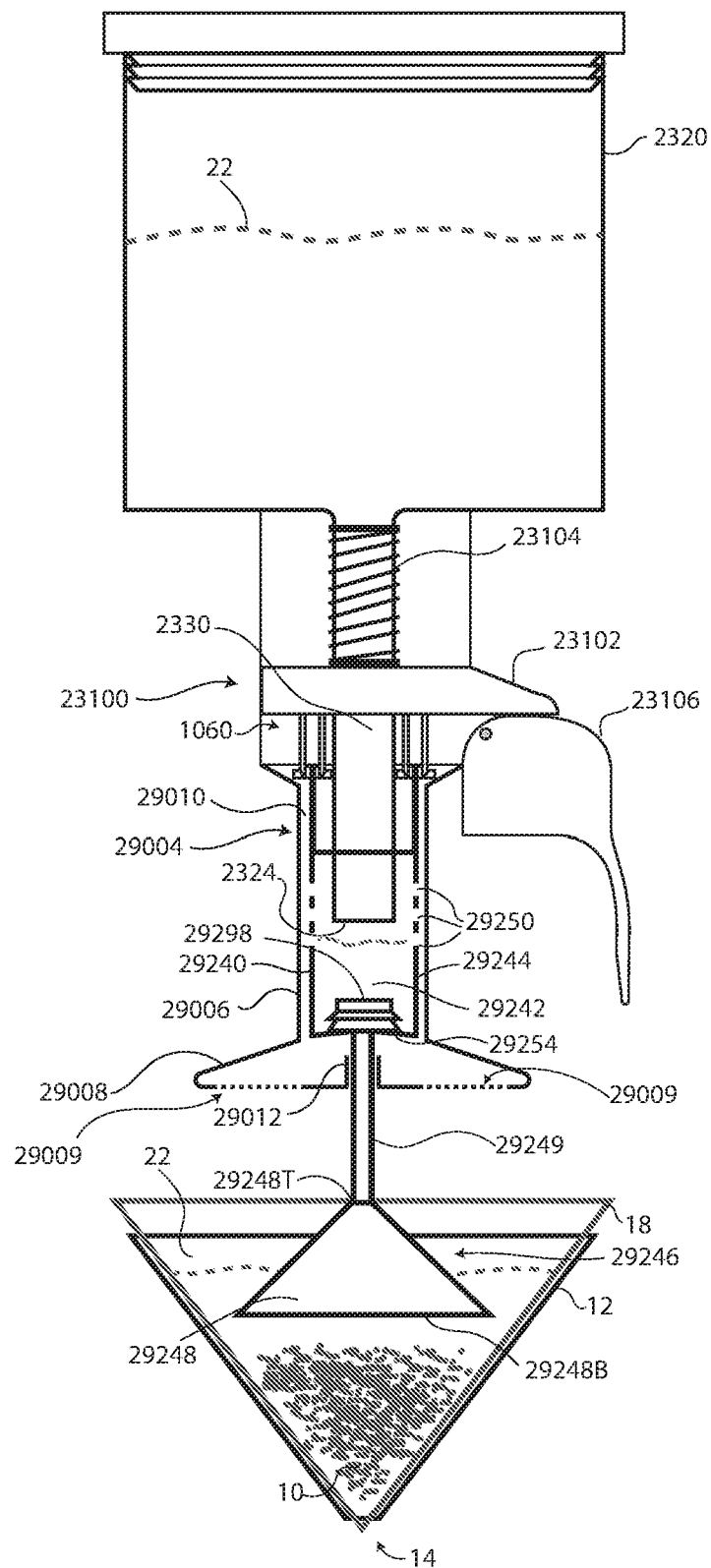
Figure 29C:
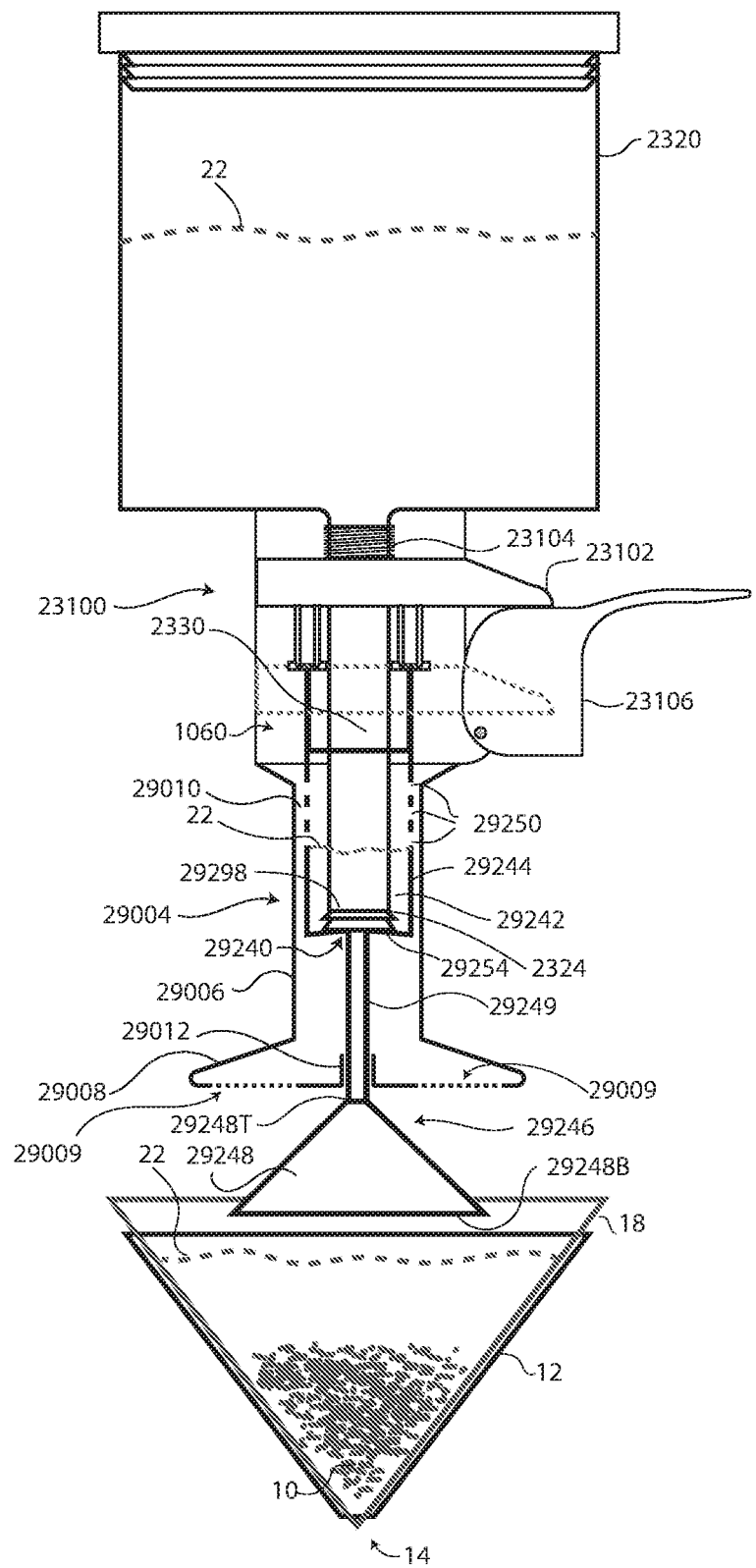

Reference is now made to FIGS. 29A to 29C, which show a seventh exemplary passive metering valve arrangement in conjunction with the same type of locking mechanism 23100 as shown in FIGS. 23A to 25C; like reference numerals refer to like features. The seventh passive metering valve arrangement shown in FIGS. 29A to 29C incorporates a guide harness 1060 of the type shown in FIGS. 10A and 10B and another modified version of the first exemplary passive metering valve 240, indicated in FIGS. 29A to 29C by reference 29240. Similarly to the version shown in FIGS. 23A to 25C, the passive metering valve 29240 includes a plug 29298 at the closed end 29254 of the tube 29244. The passive metering valve 29240 differs from the one shown in FIGS. 23A to 25C in that the passive metering valve 29240 includes a spacer shaft 29249 extending between the closed end 29254 of the tube 29244 and the closed top 29248T of the frusto-conical element 29248 that forms the float portion 29248. As the name implies, the spacer shaft 29249 spaces the closed end 29254 of the tube 29244 from the closed top 29248T of the float portion 29248 so that the bottom 29248B of the float portion 29248 can reach the water 22 in the brew basket 12.

The tube 29244, or at least the portion thereof having the reservoir 29242 and the water drainage apertures 29250, is surrounded by a hollow annular dispersion nozzle 29004, which comprises a superior tubular portion 29006 having an open superior end and an outwardly flared annular dispersion portion 29008 at the inferior end of the dispersion nozzle 29004. A plurality of dispersion apertures 29009 are formed in the dispersion portion 29008 at the inferior end of the dispersion nozzle 29004. The portion of the tube 29244 having the reservoir 29242 and the water drainage apertures 29250 is received in the superior tubular portion 29006 of the dispersion nozzle 29004 so as to be inwardly annularly spaced therefrom. Thus, there is an annular passage 29010 between the outside of the tube 29244 and the inside of the tubular portion 29006, and the spacer shaft 29249 is axially movably received in a bore 29012 formed through the dispersion portion 29008. Accordingly, the tube 29244, spacer shaft 29249 and float 29246 can reciprocate relative to the dispersion nozzle 29004, which is fixed relative to the neck 2330 of the vessel 2320.

With the cam actuator 23106 in the unlocked position, the passive metering valve 29240 can freely reciprocate between the closed configuration (FIG. 29A) and the open configuration (FIG. 29B) while the mouth 2324 of the vessel 2320 remains spaced from the plug 29298. In the open configuration (FIG. 29B), water 22 overflowing the reservoir 29242 through the water drainage apertures 29250 drains through the annular passage 29010 between the tube 29244 and the tubular portion 29006 into the dispersion portion 29008 and then through the dispersion apertures 29009 into the brew basket 12. The dispersion portion 29008 may have a convex lower interior surface shape to facilitate the flow of water toward the dispersion apertures 29009. Thus, an overflow path to the brew basket 12 is provided. In contrast, when the water 22 in the brew basket 12 rises and moves the passive metering valve 29240 into the closed configuration (FIG. 29B), the mouth 2324 of the vessel 2320 will interface with the surface of the water 22 in the tube 29244, preventing air from entering the mouth 2324 of the vessel 2320 to displace water 22 and stopping the flow of water 22 from the vessel 2320. When the cam actuator 23106 is moved into the locked position, as shown in FIG. 29C, the passive metering valve 29240 is drawn along the neck 2330 of the vessel 2320, bringing the plug 29298 into sealing engagement with the mouth 2324 of the vessel 2320.

Figure 30A:
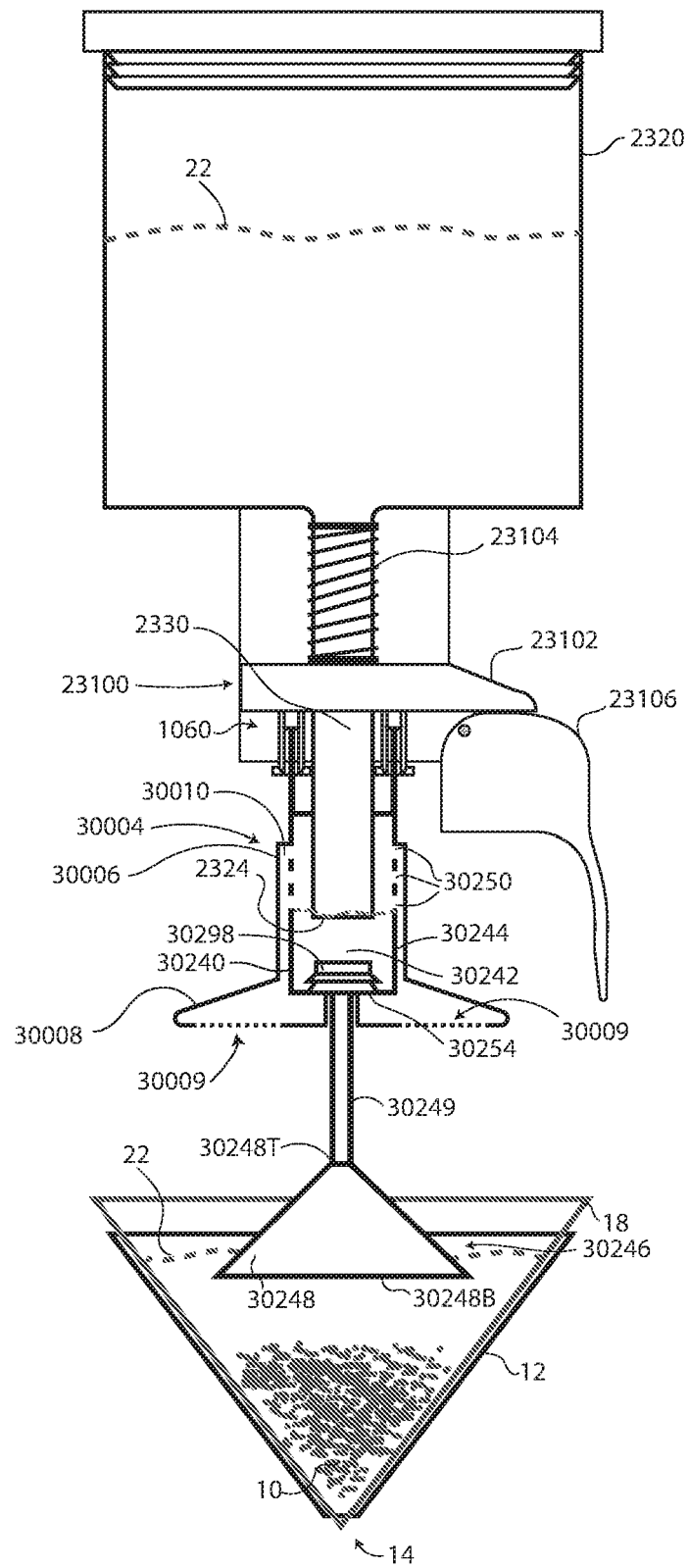
FIGS. 30A, 30B, and 30C show use of the first variant of the second exemplary locking mechanism shown in FIGS. 23A and 23B with an eighth exemplary passive metering valve according to an aspect of the present disclosure, in combination with a vessel for pour-over brewing of coffee.
Figure 30B:
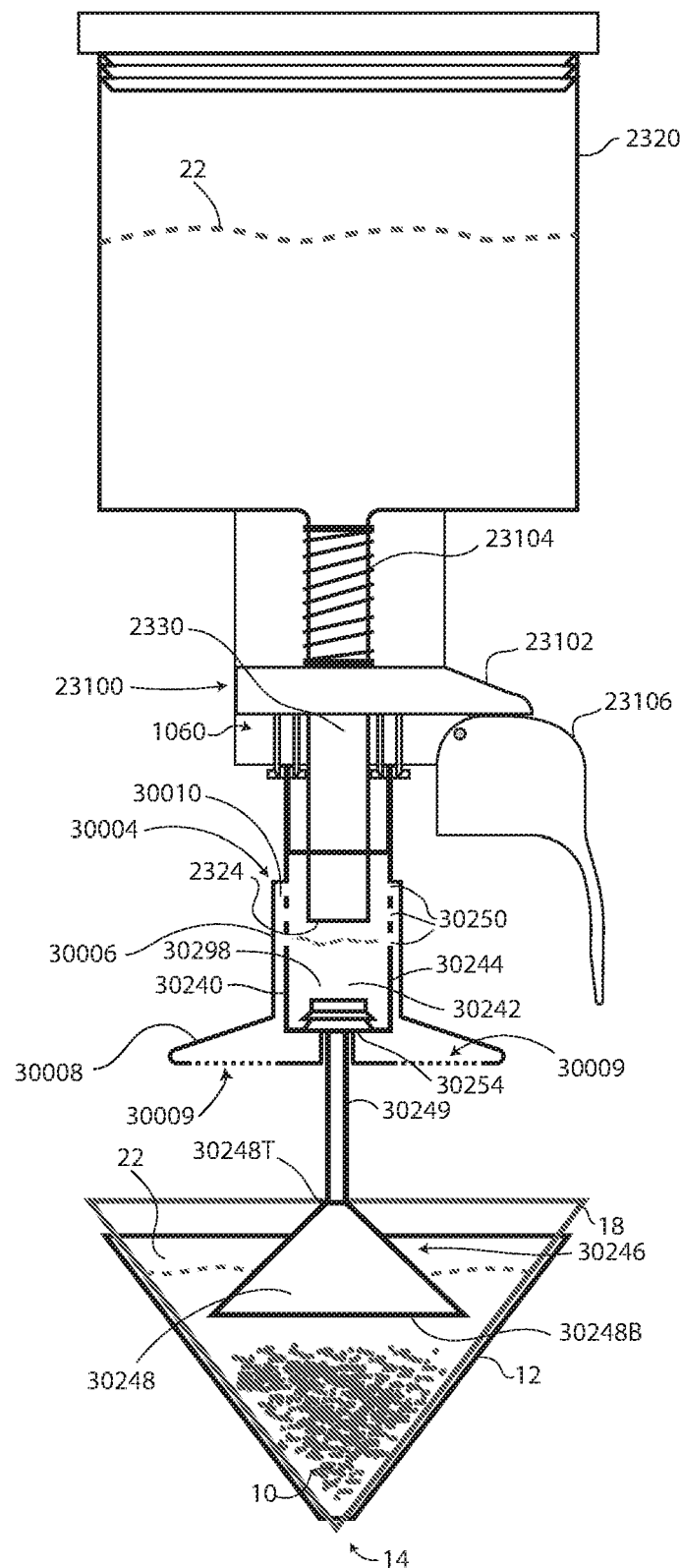
Figure 30C:
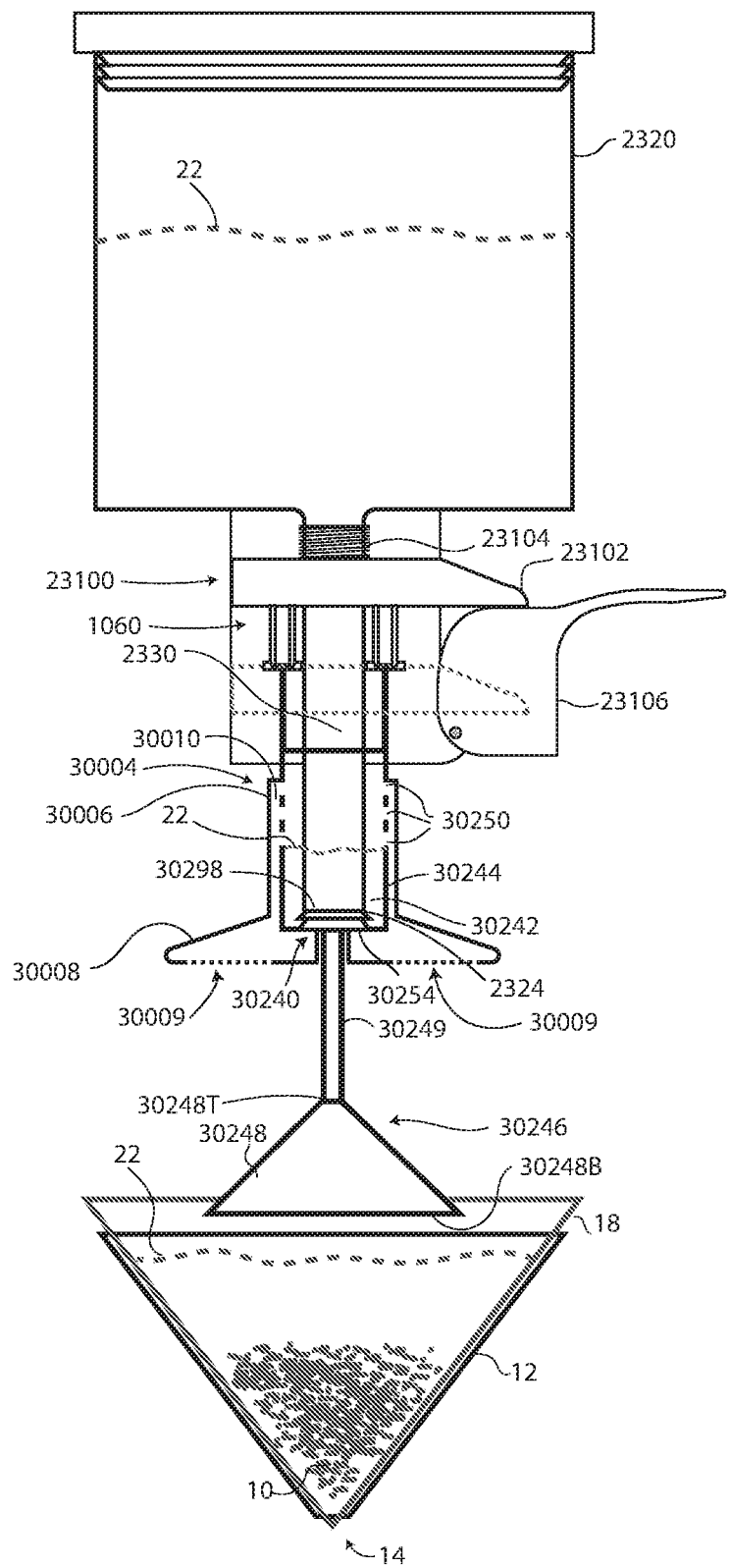

FIGS. 30A to 30C show an eighth exemplary passive metering valve arrangement in conjunction with the same type of locking mechanism 23100 as shown in FIGS. 23A to 25C, with like reference numerals denoting like features. The passive metering valve arrangement shown in FIGS. 30A to 30C is similar to that shown in FIGS. 29A to 29C in that it includes a plug 30298, a spacer shaft 30249 spacing the float 30246 from the the closed end 30254 of the tube 30244, and a dispersion nozzle 30004. Thus, corresponding references denote corresponding features, except with the prefix "30" instead of "29". However, the passive metering valve arrangement shown in FIGS. 30A to 30C differs from the embodiment shown in FIGS. 29A to 29C in that the passive metering valve 30240 (comprising the tube 30244, spacer shaft 30249 and float 30246) is fixed to the dispersion nozzle 30004, and the entire assembly (passive metering valve 30240 and dispersion nozzle 30004) can reciprocate in unison relative to the neck 2330 of the vessel 2320. More particularly, the portion of the tube 30244 having the reservoir 30242 and the water drainage apertures 30250 is fixedly nested within the superior tubular portion 30006 of the dispersion nozzle 30004 so as to be inwardly annularly spaced therefrom, forming an annular passage 30010 between the outside of the tube 30244 and the inside of the tubular portion 30006. The spacer shaft 30249 projects through a bore 30012 formed through the dispersion portion 30008 and may be, for example, threaded into or otherwise fixed in the bore 30012 so as to also support the tube 30244 within the superior tubular portion 30006 of the dispersion nozzle 30004. Alternatively, since the spacer shaft 30249 is fixed relative to the dispersion nozzle 30004, the spacer shaft may be directly mounted to the dispersion portion, independently of the tube 30244. Again, the dispersion portion 30008 may have a convex lower interior surface shape to facilitate the flow of water toward the dispersion apertures 30009.

FIGS. 30A and 30B show the cam actuator 23106 in the unlocked position, keeping the mouth 2324 of the vessel 2320 spaced from the plug 30298 while permitting the assembly comprising the passive metering valve 30240 and the dispersion nozzle 30004 to reciprocate freely between the closed configuration (FIG. 30A) and the open configuration (FIG. 30B). In the open configuration shown in FIG. 30B, water 22 overflowing the reservoir 30242 follows an overflow path to the brew basket 12, draining through the water drainage apertures 30250 into the annular passage 30010 between the tube 30244 and the tubular portion 30006 and then into the dispersion portion 30008 and then through the dispersion apertures 30009 into the brew basket 12. Optionally, water drainage apertures may be provided above the superior tubular portion 30006 of the dispersion nozzle 30004 so that water 22 can also drain along the outside of the dispersion nozzle 30004. In the closed configuration shown in FIG. 30B that results from rising of the water 22 in the brew basket 12, the mouth 2324 of the vessel 2320 will interface with the surface of the water 22 in the tube 30244. This interface between the mouth 2324 of the vessel 2320 and the surface of the water 22 in the tube 30244 prevents air from entering the mouth 2324 of the vessel 2320 to displace water 22 from therein, thereby stopping the flow of water 22 from the vessel 2320. Moving the cam actuator 23106 into the locked position (FIG. 29C), draws the passive metering valve 30240 along the neck 2330 of the vessel 2320 to bring the plug 30298 into sealing engagement with the mouth 2324 of the vessel 2320.

Figure 31A:
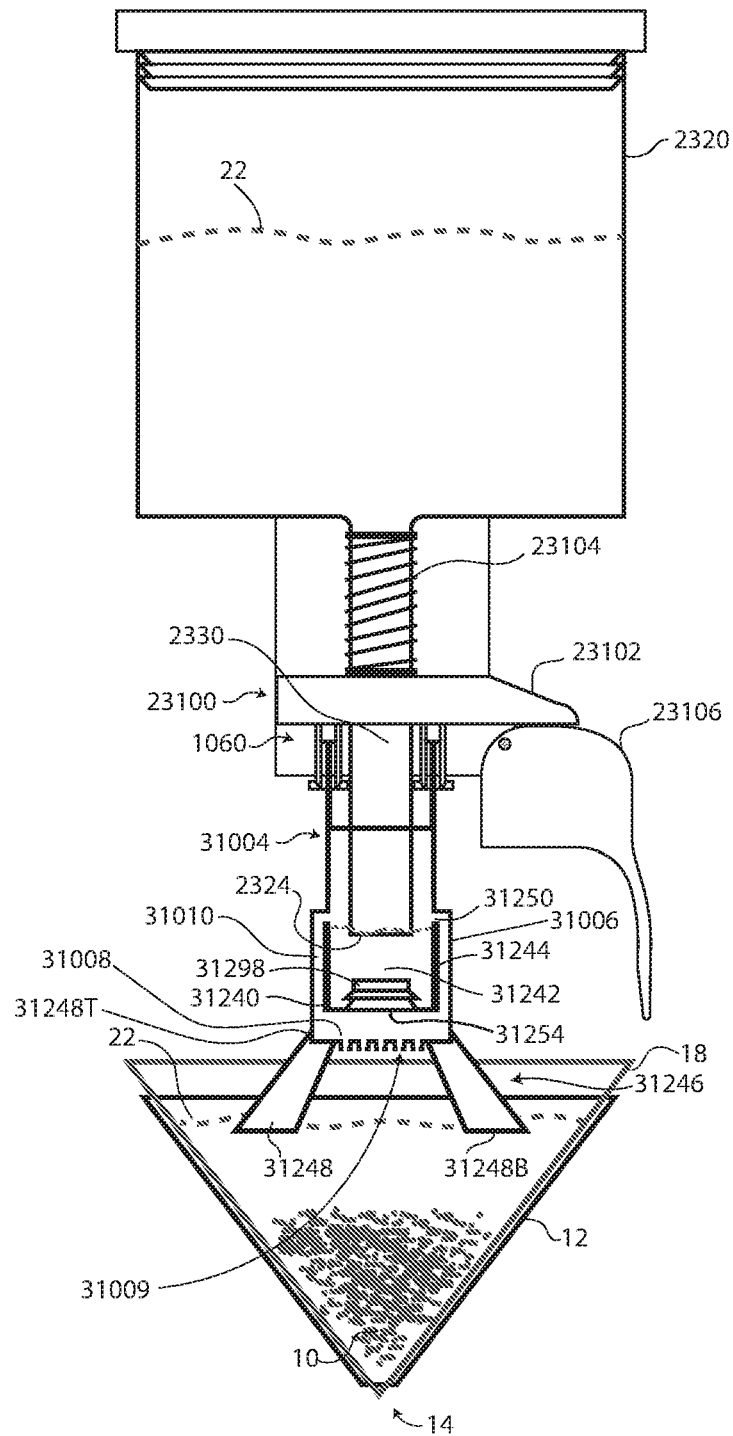
FIGS. 31A, 31B, and 31C show use of the first variant of the second exemplary locking mechanism shown in FIGS. 23A and 23B with a ninth exemplary passive metering valve according to an aspect of the present disclosure, in combination with a vessel for pour-over brewing of coffee.
Figure 31B:
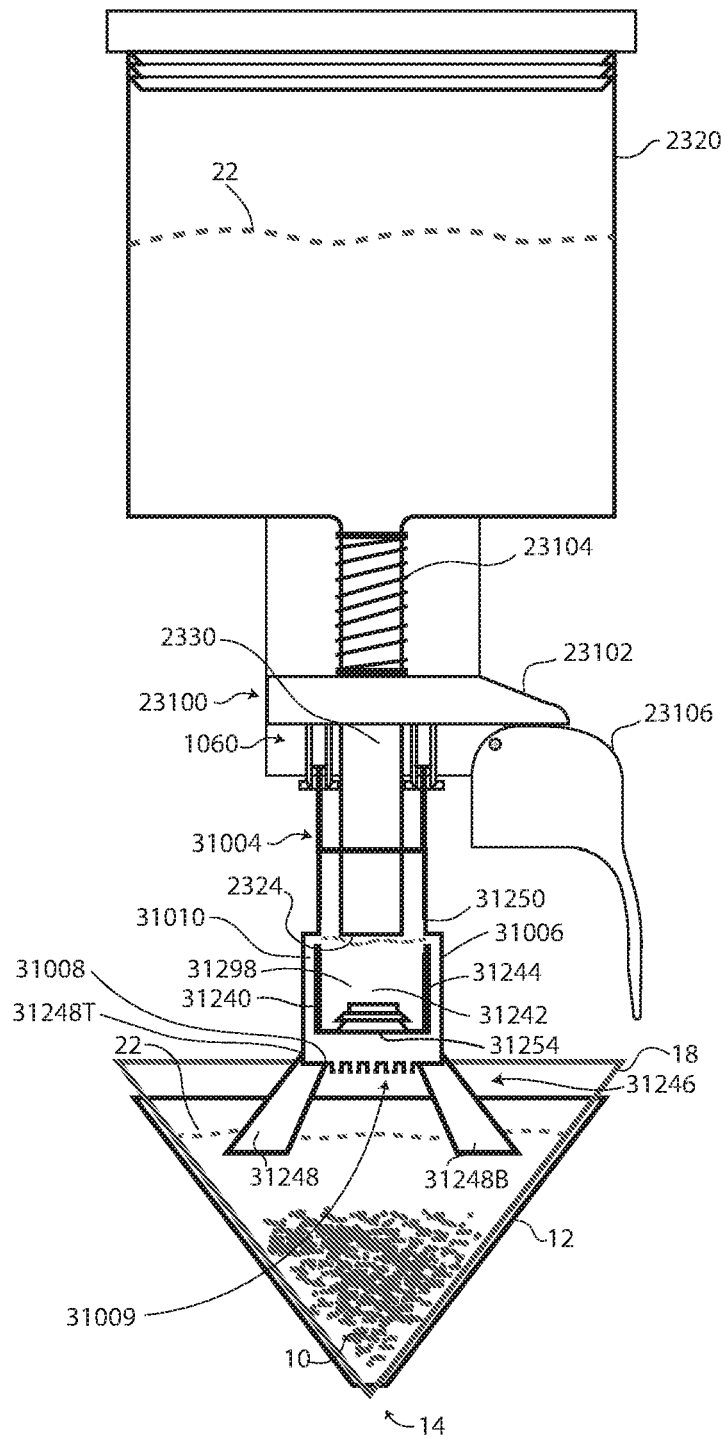
Figure 31C:
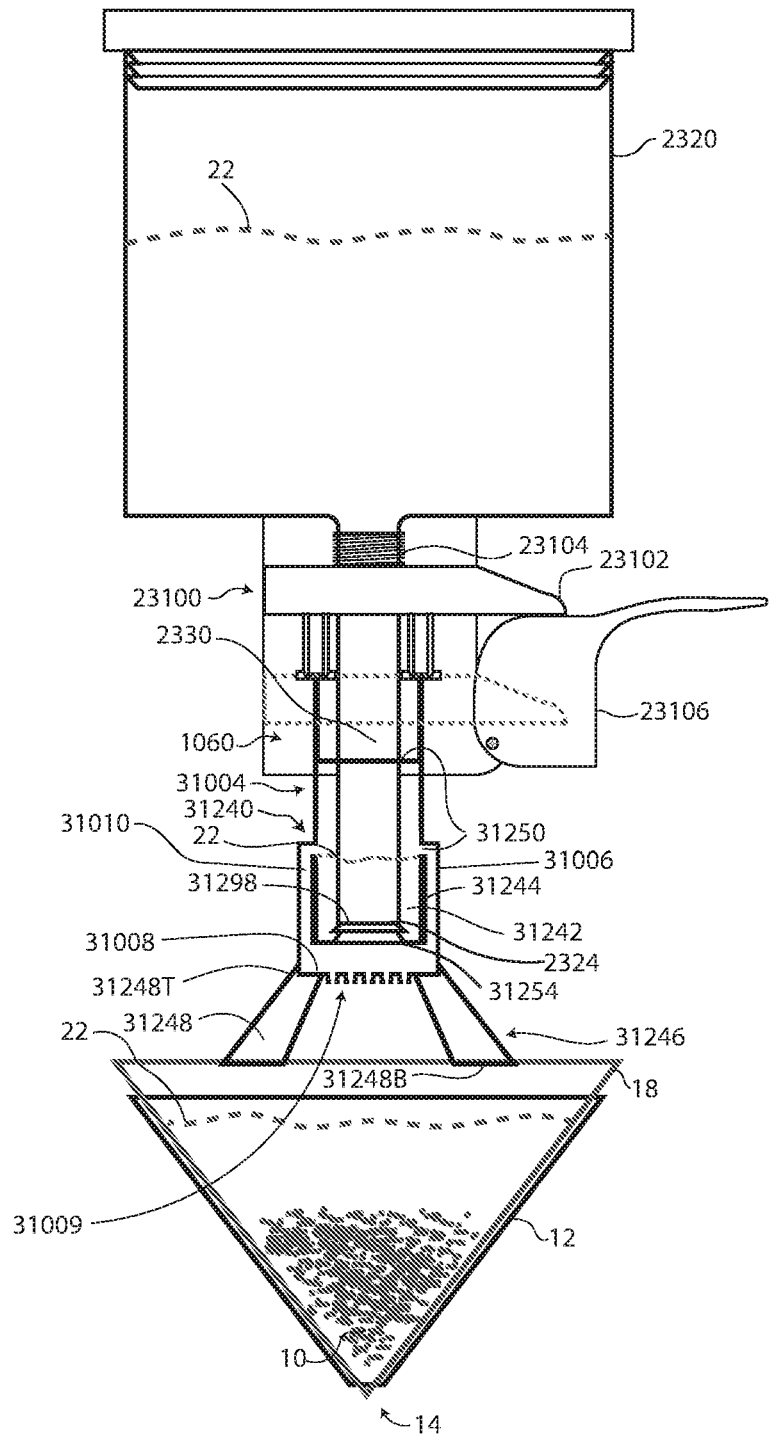

Reference is now made to FIGS. 31A to 31C, which show a ninth exemplary passive metering arrangement. The passive metering arrangement shown in FIGS. 31A to 31C is conceptually similar to that shown in FIGS. 30A to 30C in that the passive metering valve 31240 is fixed to the dispersion nozzle 31004, and the entire assembly can reciprocate in unison relative to the neck 2330 of the vessel 2320. In the embodiment shown in FIGS. 31A to 31C, the portion of the tube 31244 having the reservoir 31242 is fixedly nested within the superior tubular portion 31006 of the dispersion nozzle 31004 so as to be inwardly annularly spaced therefrom. This forms an annular passage 31010 between the outside of the tube 31244 and the inside of the tubular portion 31006, and the water drainage apertures 31250 place the reservoir 31242 in fluid communication with the annular passage 31010. In addition, the closed end 31254 of the tube 31244 is spaced from the inferior end of the dispersion nozzle 31004. Dispersion apertures 31009 are formed through the inferior end of the dispersion nozzle 31004 to define the dispersion portion 31008 of the dispersion nozzle 31004. The float portion 31246 takes the form of an annular frusto-conical element 31248 open at both ends 31248B, 31248T and which may achieve buoyancy by way of air trapped between the open bottom 31248B and the top 31248T when the open bottom 31248B engages the surface of the water 22 in the brew basket 12. The dispersion apertures 31009 are positioned in registration with the open top 31248T of the frusto-conical element 31248.

When the cam actuator 23106 is in the unlocked position, as shown in FIGS. 31A and 31B, the mouth 2324 of the vessel 2320 spaced from the plug 31298 and the assembly comprising the passive metering valve 31240 and the dispersion nozzle 31004 can freely reciprocate between the open configuration (FIG. 31B) and the closed configuration (FIG. 31A). In the open configuration, as shown in FIG. 31B, water 22 overflowing the reservoir 31242 passes through the water drainage apertures 31250 into the annular passage 31010 between the tube 31244 and the tubular portion 31006 and then into the dispersion portion 31008 underneath the reservoir 31242. From there, the water 22 continues along the overflow path to the brew basket 12 by draining through the dispersion apertures 31009, through the hollow frusto-conical element 31248 and into the brew basket 12. When the water 22 in the brew basket 12 rises and moves the passive metering valve 31240 into the closed configuration shown in FIG. 31B, the mouth 2324 of the vessel 2320 interfaces with the surface of the water 22 in the tube 31244, preventing air from entering the mouth 2324 of the vessel 2320 to displace water 22 so as to stop the flow of water 22 from the vessel 2320. FIG. 31C shows the cam actuator 23106 in the locked position, where the plug 31298 seals the mouth 2324 of the vessel 2320.

Figure 32A:
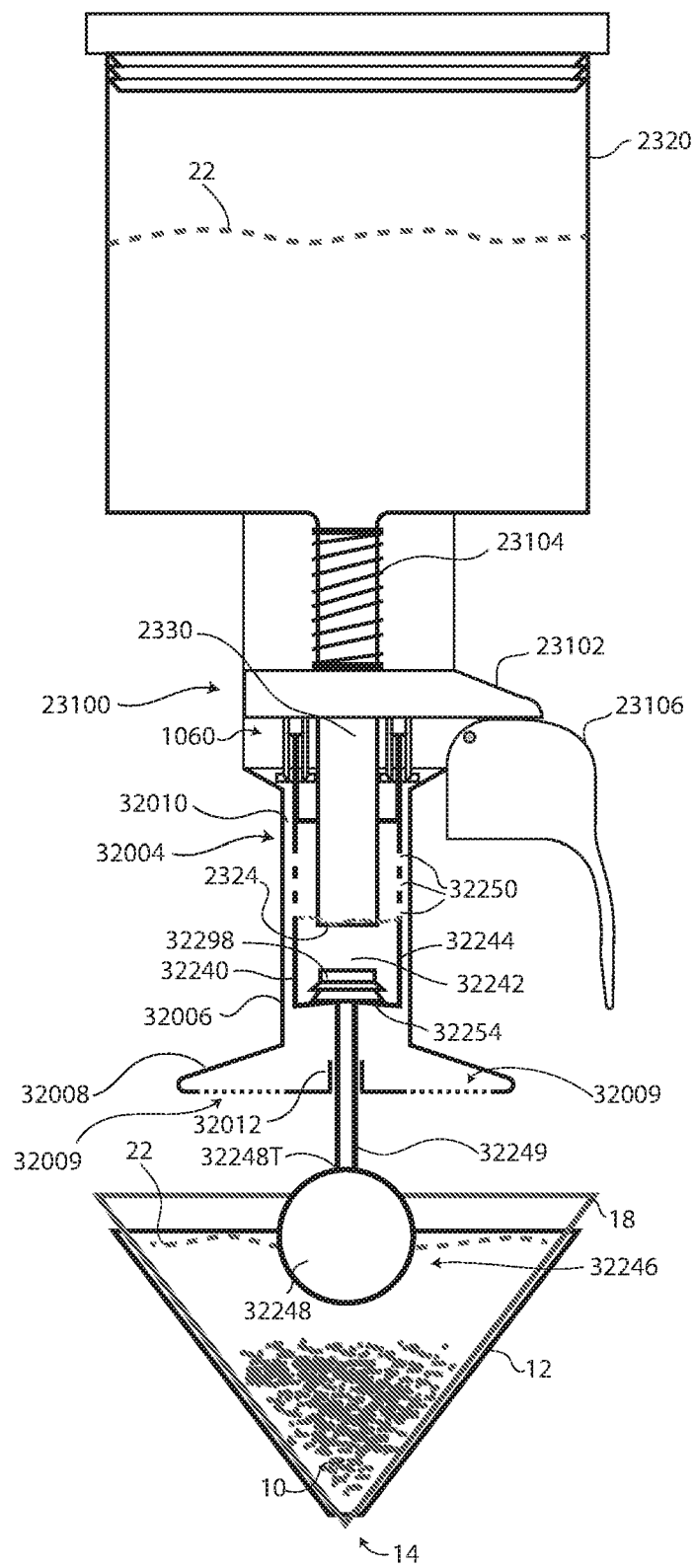
FIGS. 32A, 32B, and 32C show use of the first variant of the second exemplary locking mechanism shown in FIGS. 23A and 23B with a tenth exemplary passive metering valve according to an aspect of the present disclosure, in combination with a vessel for pour-over brewing of coffee.
Figure 32B:
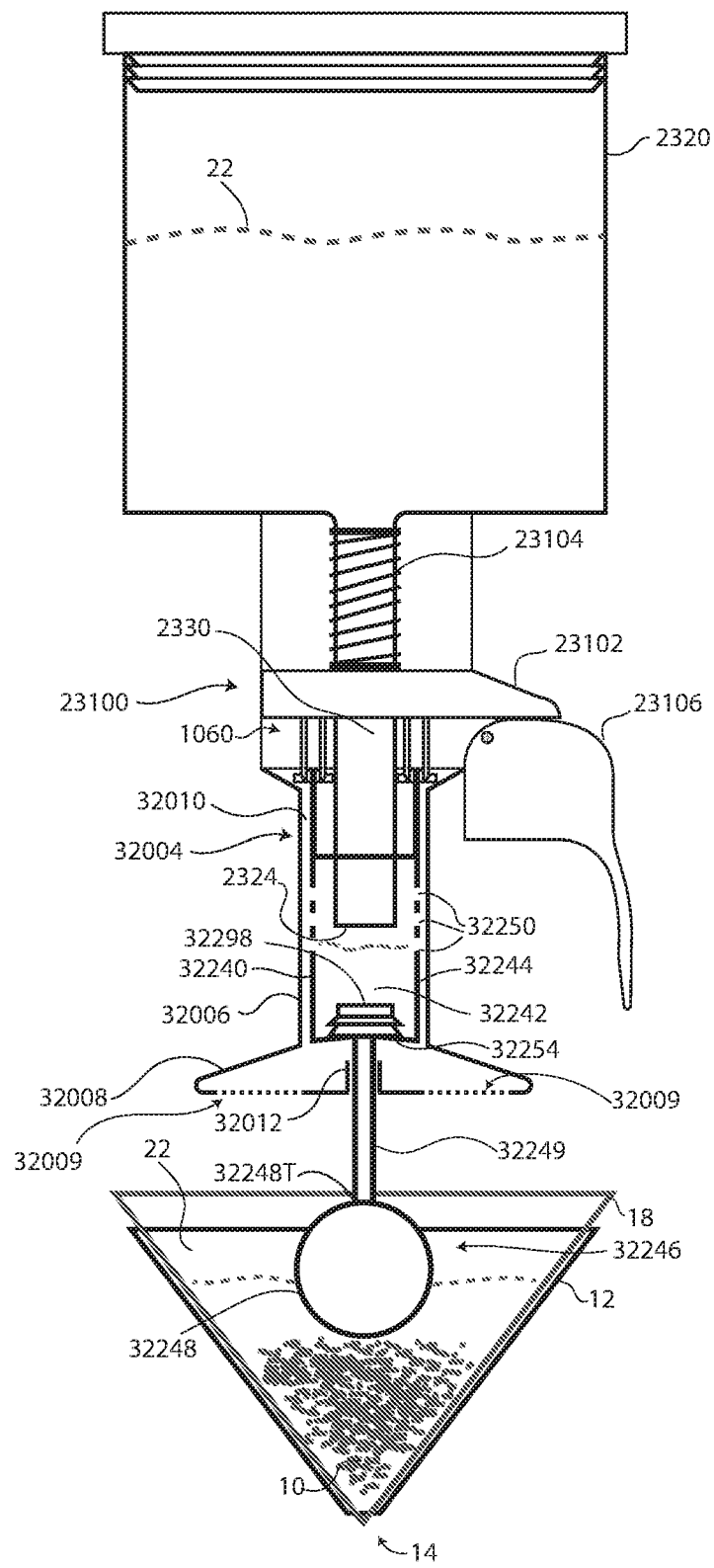
Figure 32C:
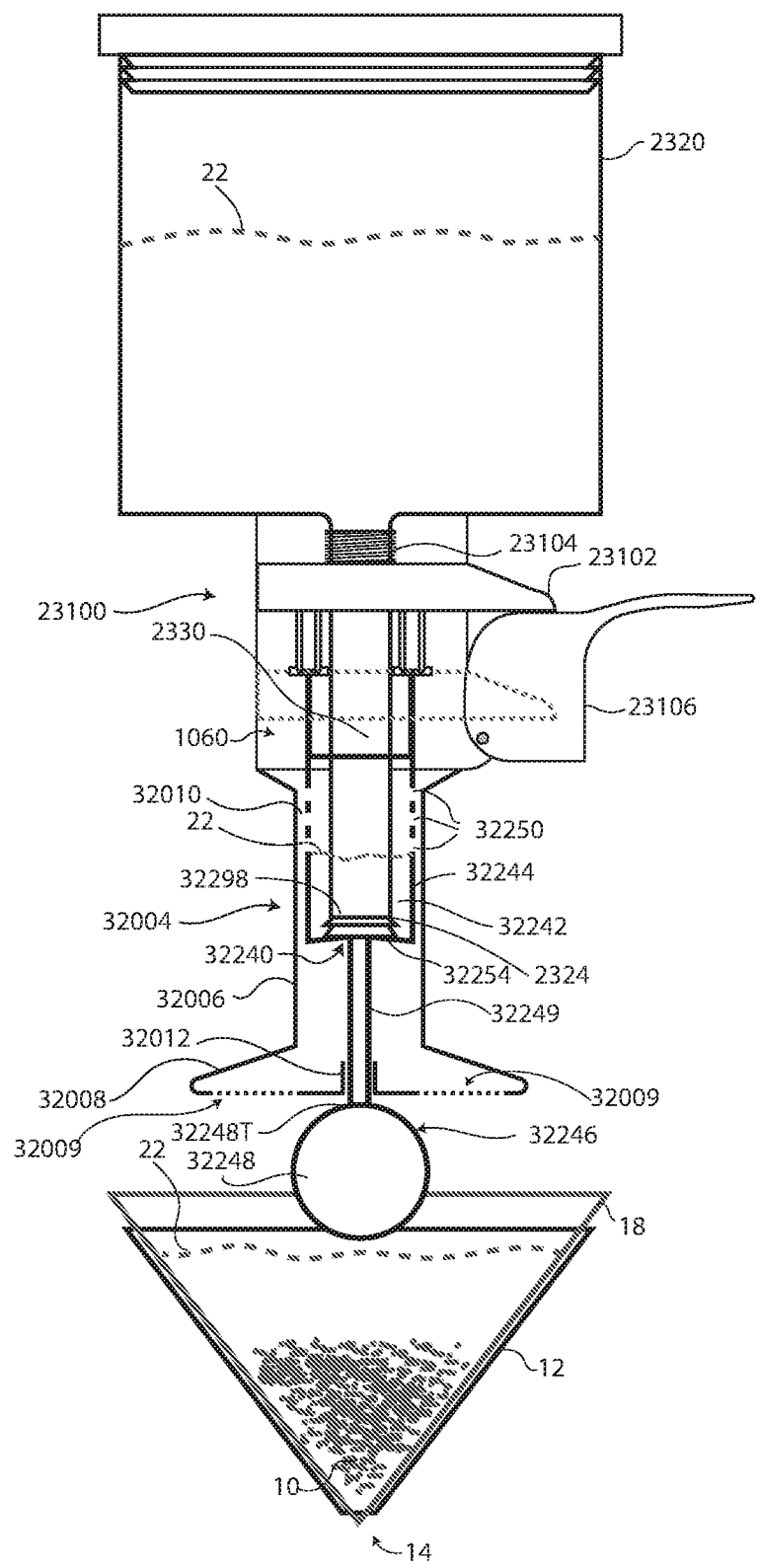

As noted above, the float may have other shapes besides frusto-conical, and may be a solid element or a closed hollow element. FIGS. 32A to 32C show a tenth exemplary passive metering valve arrangement which is identical to the eighth exemplary passive metering valve arrangement shown in FIGS. 29A to 29C except that the float 32248 is an enclosed hollow sphere. Like reference numerals denote like features, except with the prefix "32" instead of "29". Operation of the tenth exemplary passive metering valve arrangement shown in FIGS. 32A and 32B is the same as for the eighth exemplary passive metering valve arrangement shown in FIGS. 29A to 29C. FIGS. 32A and 32B show the show the cam actuator 23106 in the unlocked position, with FIG. 32A showing the closed configuration and FIG. 32B showing the open configuration. FIG. 32C shows the cam actuator 23106 in the locked position.

FIGS. 4A, 4B, 9D, 9F, 10A, 10B show the container as a coffee mug, while FIGS. 9B, 9C, 9G, 9E and 26A to 29A show the container as the lower part of a monolithic, generally hourglass-shaped device, the upper part of which forms the brew basket, as described in U.S. Pat. No. 2,241,368 issued May 6, 1941 to Peter Schlumbohm. Devices according to this latter design are available from Chemex® Corp., having an address at 11 Veterans Drive, Chicopee, Mass. 01022. It is to be appreciated that the aforementioned containers are merely exemplary, rather than limiting, of containers with which passive metering valves according to aspects of the present invention may be used.

It is contemplated that a passive metering valve according to the present disclosure, with or without a locking mechanism, may be used with, or incorporated into, a coffee brewing apparatus that also includes a stand or similar support and a vessel (for containing the water used to brew the coffee) carried by the support. In order to accommodate containers and brew baskets of various sizes and shapes, the vessel may be carried by the support in such a way as to be vertically adjustable. For example, and without limitation, the vessel may slide along rails on the support, with a fixation mechanism such as a clamp, locking pin/aperture combination, or other arrangement being used to secure the vessel at a fixed vertical position. Optionally, the vessel may be provided with a removable lid opposite its drainage aperture to facilitate filling, and the coffee brewing apparatus may be provided with a heater for heating the water in the vessel. Where both a heater and a removable lid are incorporated into the coffee brewing apparatus, an automated locking system, for example a mechanical or electromechanical system, may be provided to prevent or inhibit opening of the removable lid during heating. Moreover, where a locking mechanism (e.g. those shown in FIGS. 23A to 24B) is provided to seal the mouth the vessel, a mechanical interlock between the locking mechanism and the handle may be provided to prevent or inhibit opening of the removable lid unless the locking mechanism is in the locked configuration such that the mouth of the vessel is sealed.

Numerous other variations and adaptations are of course contemplated. For example, it is contemplated that the passive metering valve described herein could be applied to other applications beyond coffee brewing, for example to brewing of tea, or to metering of a water supply (e.g. to a trough for livestock or to a bowl for domestic animals such as dogs or cats).

Several exemplary embodiments have been described by way of example. It will be apparent to persons skilled in the art that a number of variations and modifications can be made without departing from the scope of the claims. The scope of the claims should not be limited by the preferred embodiments set forth in the examples, but should be given the broadest interpretation consistent with the description as a whole. As such, various modifications and additions to the disclosed apparatus will occur to those skilled in the art, without departing from the scope of the claims as purposively construed.

What is claimed is:

1. A method for pour-over brewing of coffee, the method comprising: supporting a quantity of ground coffee in a brew basket having at least one coffee drainage aperture formed therethrough; suspending a vessel containing brew-heated water over the brew basket so that the water in the vessel can drain under gravity from a mouth of the vessel into the brew basket and into the ground coffee to brew liquid coffee, the vessel being closed other than the mouth thereof; and draining the liquid coffee into a container; wherein: rising of a level of the water in the brew basket causes interruption of drainage of the water from the mouth of the vessel into the brew basket; and lowering of the level of the water in the brew basket causes resumption of drainage of the water from the mouth of the vessel into the brew basket.

2. The method of claim 1, wherein: the vessel is positioned with its mouth within the brew basket; rising of the level of the water in the brew basket causes interruption of drainage of the water from the mouth of the vessel into the brew basket by obstructing a flow of air into the vessel when the level of the water reaches the mouth of the vessel; and lowering of the level of the water in the brew basket causes resumption of drainage of the water from the mouth of the vessel into the brew basket by permitting the flow of air into the vessel when the level of the water falls below the mouth of the vessel.

3. The method of claim 1, wherein a passive metering valve is interposed in a fluid path between the mouth of the vessel and the brew basket.

4. The method of claim 3, wherein the passive metering valve is configurable, relative to the mouth of the vessel, in: an open configuration in which the water in the vessel can drain under gravity from the mouth of the vessel into the brew basket; and a closed configuration in which drainage of the water in the vessel from the mouth of the vessel into the brew basket is inhibited.

5. The method of claim 4, wherein: when the passive metering valve is in the closed configuration, drainage of the water in the vessel from the mouth of the vessel into the brew basket is inhibited by obstruction of a flow of air into the vessel to inhibit displacement of the water in the vessel; and when the passive metering valve is in the open configuration, drainage of the water in the vessel from the mouth of the vessel into the brew basket is permitted by permitting the flow of air into the vessel to displace the water in the vessel.

6. The method of claim 5, wherein: a float portion of the passive metering valve is buoyantly supported by the water in the brew basket; rising of the level of the water in the brew basket causes interruption of drainage of the water from the mouth of the vessel into the brew basket by flotation of the float portion moving the passive metering valve into the closed configuration; and lowering of the level of the water in the brew basket causes resumption of drainage of the water from the mouth of the vessel into the brew basket by flotation of the float portion moving the passive metering valve into the open configuration.

7. The method of claim 6, wherein: the passive metering valve comprises the float portion and a reservoir carried by the float portion; the reservoir being in fluid communication with the vessel for receiving the water from the vessel; the reservoir overflowing into the brew basket; rising of the level of the water in the brew basket causes interruption of drainage of the water from the mouth of the vessel into the brew basket by flotation of the float portion raising the passive metering valve until the water in the reservoir obstructs the flow of air into the vessel; and lowering of the level of the water in the brew basket causes resumption of drainage of the water from the mouth of the vessel into the brew basket by flotation of the float portion lowering the passive metering valve until the flow of air into the vessel is unobstructed by the water in the reservoir and the water in the reservoir overflows from the reservoir into the brew basket upon displacement by the water from the vessel.

8. The method of claim 7, wherein: the reservoir is formed by a tube depending from and sealed off from the float portion; the tube having at least one water drainage aperture longitudinally spaced from the float portion; an end of the tube remote from the float portion being open for receiving the water from the vessel; rising of the level of the water in the brew basket causes interruption of drainage of the water from the mouth of the vessel into the brew basket by flotation of the float portion raising the passive metering valve until the water in the tube obstructs the flow of air into the vessel; and lowering of the level of the water in the brew basket causes resumption of drainage of the water from the mouth of the vessel into the brew basket by flotation of the float portion lowering the passive metering valve until the flow of air into the vessel is unobstructed by the water in the tube and the water in the tube can drain from the tube through the at least one water drainage aperture into the brew basket.

9. The method of claim 1, wherein a filter is interposed between the ground coffee and the at least one coffee drainage aperture formed through the brew basket.

10. The method of claim 1, wherein the brew basket includes an integral filter.

* * * * *